US011606686B2

(12) United States Patent
Alameh et al.

(10) Patent No.: US 11,606,686 B2
(45) Date of Patent: Mar. 14, 2023

(54) ELECTRONIC DEVICES AND CORRESPONDING METHODS FOR ESTABLISHING GEOFENCING FOR ENHANCED SECURITY MODES OF OPERATION

(71) Applicant: Motorola Mobility LLC, Chicago, IL (US)

(72) Inventors: Rachid Alameh, Crystal Lake, IL (US); John Gorsica, Round Lake, IL (US)

(73) Assignee: Motorola Mobility LLC, Chicago, IL (US)

( * ) Notice: Subject to any disclaimer, the term of this patent is extended or adjusted under 35 U.S.C. 154(b) by 360 days.

(21) Appl. No.: 16/745,050

(22) Filed: Jan. 16, 2020

(65) Prior Publication Data

US 2021/0227383 A1    Jul. 22, 2021

(51) Int. Cl.
*H04W 12/00*    (2021.01)
*H04W 12/02*    (2009.01)
*H04W 12/63*    (2021.01)
*H04W 12/065*    (2021.01)

(52) U.S. Cl.
CPC ......... *H04W 12/02* (2013.01); *H04W 12/065* (2021.01); *H04W 12/63* (2021.01)

(58) Field of Classification Search
CPC ... H04W 12/02; H04W 12/065; H04W 12/63; H04W 12/009; H04W 12/64
See application file for complete search history.

(56) References Cited

U.S. PATENT DOCUMENTS

| | | | |
|---|---|---|---|
| 9,706,380 B1* | 7/2017 | Murchison | H04W 4/021 |
| 9,769,604 B2 | 9/2017 | Lyman et al. | |
| 10,420,031 B2 | 9/2019 | Alameh et al. | |
| 2010/0017126 A1 | 1/2010 | Holcman et al. | |
| 2013/0099977 A1* | 4/2013 | Sheshadri | H04W 4/022 342/450 |
| 2014/0031011 A1* | 1/2014 | West | H04W 12/06 455/411 |

(Continued)

OTHER PUBLICATIONS

"Geofencing & GPS Tracking", Amtel Netplus Mobility; Viewed online Jan. 11, 2020 at http://www.amtelnet.com/solutions/mobile-security/geofencing-gps-tracking/; Publication date unknown but prior to filing of present application.

(Continued)

*Primary Examiner* — Amie C. Lin
(74) *Attorney, Agent, or Firm* — Philip H. Burrus, IV

(57) ABSTRACT

One or more sensors of an electronic device detect either authorization of an authorized user or a cessation of physical contact between an authorized user of the electronic device and the electronic device. A location detector determines a location of the electronic device when the authorization of the authorized user occurs or where the cessation of physical contact occurs. A geofence manager establishes a geofence about the location in response to detecting the authorization of the authorized user or the cessation of physical contact. One or more processors operate the electronic device in a normal mode of operation while the electronic device remains within the geofence and in an enhanced security mode of operation when the electronic device exits the geofence.

20 Claims, 10 Drawing Sheets

(56) References Cited

U.S. PATENT DOCUMENTS

| | | | |
|---|---|---|---|
| 2014/0266698 A1* | 9/2014 | Hall | H04W 4/023 |
| | | | 340/539.13 |
| 2016/0007156 A1* | 1/2016 | Chiou | H04W 4/022 |
| | | | 455/456.3 |
| 2016/0232790 A1* | 8/2016 | Massey | G05D 1/0011 |
| 2016/0261424 A1* | 9/2016 | Gamberini | G05B 15/02 |
| 2017/0364901 A1* | 12/2017 | Chandrasekaran | |
| | | | G06Q 20/4014 |
| 2018/0121913 A1 | 5/2018 | Unnerstall et al. | |
| 2018/0184239 A1 | 6/2018 | Bestor et al. | |
| 2018/0247036 A1* | 8/2018 | Vincent | G06F 21/32 |
| 2019/0034077 A1 | 1/2019 | Krecioch et al. | |
| 2019/0223080 A1 | 7/2019 | Wawrowski et al. | |
| 2019/0258785 A1 | 8/2019 | Alameh et al. | |
| 2019/0287513 A1 | 9/2019 | Alameh et al. | |
| 2020/0162899 A1* | 5/2020 | Brandes | H04W 12/61 |
| 2020/0341107 A1* | 10/2020 | Czarnecky | G01S 5/02 |

OTHER PUBLICATIONS

Hildenbrand, Jerry, "How to use Smart Lock to unlock your phone automatically", Published online on Jan. 28, 2018 at https://www.androidcentral.com/smart-lock; viewed online Jan. 11, 2020.

* cited by examiner

ELECTRONIC DEVICES AND CORRESPONDING METHODS FOR ESTABLISHING GEOFENCING FOR ENHANCED SECURITY MODES OF OPERATION

BACKGROUND

Technical Field

This disclosure relates generally to electronic devices, and more particularly to electronic devices having sensors.

Background Art

Portable electronic devices, such as smartphones and tablet computers, are now the primary electronic tools with which people communicate, engage in commerce, maintain calendars and itineraries, monitor health, capture images and video, and surf the Internet. In many instances, a person is more likely to carry a smartphone than a watch or wallet. As these devices store more and more personal information, it can be distressing to misplace or lose a primary electronic device, as one may worry that an unauthorized party may be able to access an authorized user's personal information. It would be advantageous to have improved devices and systems to prevent situations such as this from occurring.

Figure 1:
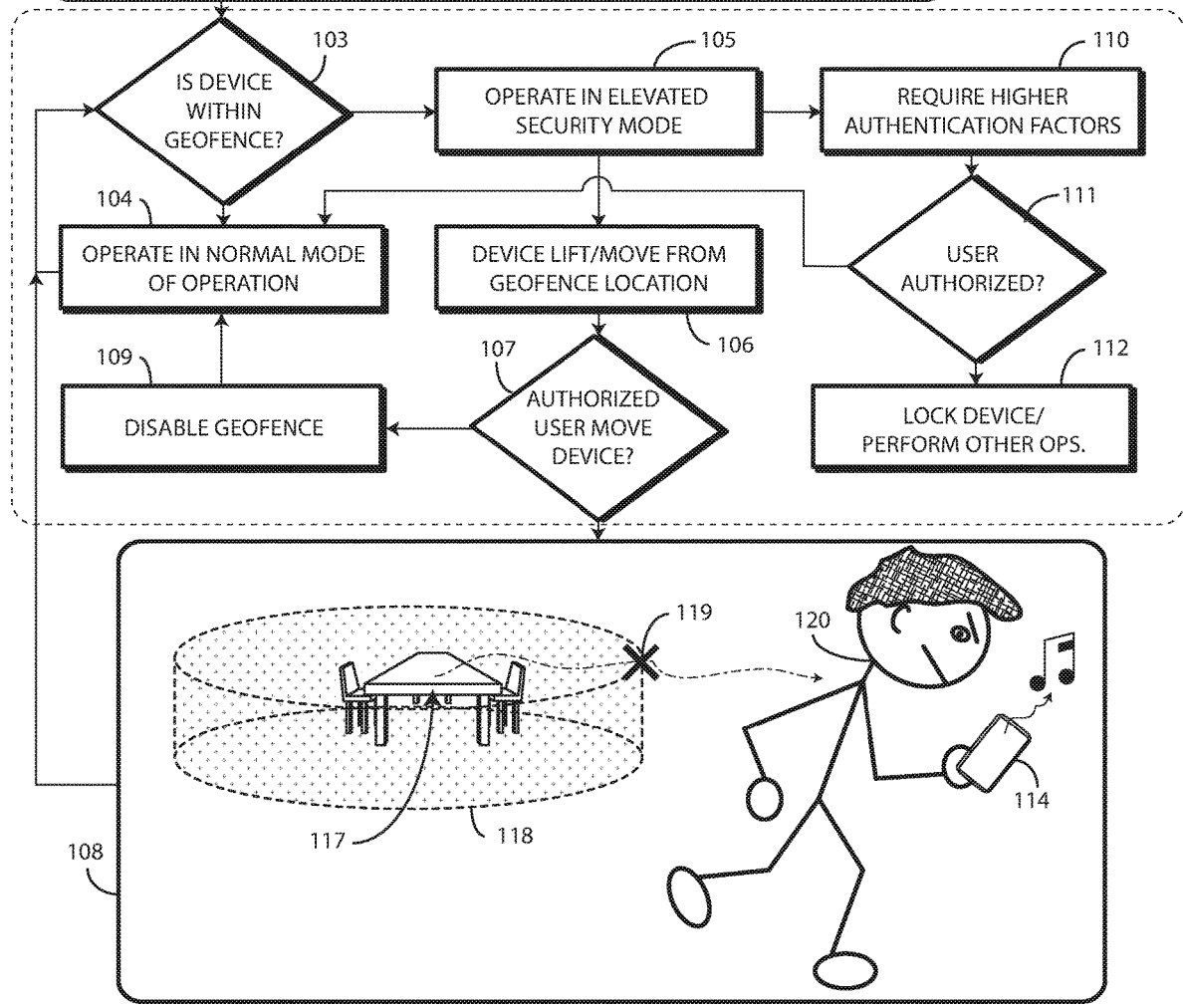
FIG. 1 illustrates one explanatory method in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to establishing a geofence about an electronic device, where the electronic device functions in a normal mode of operation while it remains within the geofence, but transitions to an enhanced security mode of operation when the electronic device exits the geofence. Any process descriptions or blocks in flow charts should be understood as representing modules, segments, or portions of code that include one or more executable instructions for implementing specific logical functions or steps in the process. Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to electronic device and/or user interface technology, improve the functioning of the electronic device itself by and improving the overall user experience to overcome problems specifically arising in the realm of the technology associated with electronic device user interaction.

It will be appreciated that embodiments of the disclosure described herein may be comprised of one or more conventional processors and unique stored program instructions that control the one or more processors to implement, in conjunction with certain non-processor circuits, some, most, or all of the functions of establishment of a geofence, such as when an electronic device is placed upon a surface, given to a person who is not the authorized user, or is nefariously taken from the authorized user as described herein. The non-processor circuits may include, but are not limited to, a radio receiver, a radio transmitter, signal drivers, clock circuits, power source circuits, and user input devices. As such, these functions may be interpreted as steps of a method to perform the establishment of the geofence, transitions between a normal mode of operation and an enhanced security mode of operation, including the performance of various control operations while in the enhanced security mode of operation, and/or terminating the geofence in response to certain actions performed by the authorized user. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions.

As used herein, components may be "operatively coupled" when information can be sent between such components, even though there may be one or more intermediate or intervening components between, or along the connection path. The terms "substantially", "essentially", "approximately", "about" or any other version thereof, are defined as being close to as understood by one of ordinary skill in the art, and in one non-limiting embodiment the term is defined to be within ten percent, in another embodiment within five percent, in another embodiment within one percent and in another embodiment within one-half percent. The term "coupled" as used herein is defined as connected, although not necessarily directly and not necessarily mechanically. Also, reference designators shown herein in parenthesis indicate components shown in a figure other than the one in discussion. For example, talking about a device (10) while discussing figure A would refer to an element, 10, shown in figure other than figure A.

Embodiments of the disclosure provide methods and electronic devices that establish a geofence having a geofence boundary about a particular location or about an electronic device. Illustrating by example, in one or more embodiments, when an authorized user places an electronic device on a surface, such that there is a cessation of physical contact between the authorized user and the electronic device, an optionally, a stationary state of the electronic device, one or more sensors of the electronic device detect this "placed down" condition of the electronic device. A location detector can determine a location of the electronic device when the cessation of physical contact and/or the detection, by one or more motion sensors, of the stationary state occurs.

In one or more embodiments, a geofence manager, which can be operable with one or more processors, configured as a component of the one or more processors, or configured as one or more executable code modules operating on the one or more processors, establish a geofence about the location determined by the location detectors, or alternatively about the electronic device itself. In one or more embodiments, the geofence defines a boundary about the location or electronic device fixed by one or more geographic coordinates. For example, the geofence may be defined by a radius of, say, thirty feet around the location determined by the location detectors when the electronic device is placed down in one embodiment. In one or more embodiments, the predefined radius of the geofence is user-definable using a menu of the electronic device.

In one or more embodiments, the one or more processors of the electronic device operate the electronic device in a normal mode of operation, with all functions and data being accessible, so long as the electronic device remains within the geofence. However, when the electronic device exits the geofence, in one or more embodiments the one or more processors cause the electronic device to enter an enhanced security mode of operation. When operating in the enhanced security mode of operation, various control operations can be performed to limit access to functions and/or data. Such control operations can be defined by a user using a menu of the electronic device in one or more embodiments. In other embodiments, the enhanced security mode of operation can lock the electronic device all together.

Thus, in one or more embodiments when an authorized user places an electronic device on a surface, such as a table, a geofence is created. When the electronic device is within the geofence, it operates normally. However, when the electronic device is moved outside the geofence, it operates in an enhanced security mode of operation. In one or more embodiments, the authorized user can terminate the geofence by touching the electronic device, e.g., by picking the electronic device back up when the electronic device is within the geofence. In one or more embodiments, when the authorized user picks the electronic device back up, one or more sensors of the electronic device confirm that it is indeed the authorized user holding the electronic device. The geofence can then be reestablished when the electronic device is placed down again, and so forth.

To illustrate by example, imagine an authorized user of an electronic device is engaging in a phone call using a smartphone in a restaurant. At the end of the call, imagine the authorized user placing the electronic device on the table. In one or more embodiments, when this occurs, one or more sensors of the electronic device detect the release of the authorized user's hand from the electronic device as a cessation of physical contact between the authorized user and the electronic device. In one or more embodiments, this causes a location detector of the electronic device to determine a location of the electronic device when the cessation of physical contact occurs.

In one or more embodiments, a geofence manager then establishes a geofence about the location in response to the cessation of the physical contact between the authorized user of the electronic device and the electronic device. The geofence can have a predefined radius, which can be defined by user input delivered to a user interface of the electronic device in one or more embodiments. For example, the geofence may have a radius of thirty feet about the location detected by the location detector when the cessation of physical contact between the authorized user and the electronic device occurred.

In one or more embodiments, if the authorized user picks up the electronic device again, i.e., if the one or more sensors detect a recurrence of the physical contact between the authorized user and the electronic device within the geofence, in one or more embodiments the geofence manager terminates the geofence about the location in response. Thus, if the authorized user "grabs" the electronic device again and moves to another location, the geofence is terminated and then reestablished at the new location where the authorized user puts the electronic device down.

In one or more embodiments, if the authorized user leaves the restaurant without the electronic device, the geofence remains in place. In one or more embodiments, the one or more processors of the electronic device operate the electronic device in a normal mode of operation so long as the electronic device remains within the geofence established about the location. In one or more embodiments, the identity of the authorized user is captured seamlessly during use by way of touchless authentication procedures performed by the one or more sensors, or alternatively on demand by the one or more processors, such as when the one or more processors request that the authorized user enter authentication credentials at a user interface, such as a personal identification number (PIN), delivering fingerprint data to an fingerprint sensor, and so forth.

In one or more embodiments, if a person who is not the authorized user picks up the electronic device and starts walking with it, when the electronic device exits the geofence, the one or more processors cause the electronic device to transition from the normal mode of operation to the enhanced security mode of operation. Various things can happen when the electronic device enters the enhanced security mode of operation. For example, the one or more processors may require a reauthorization of the authorized user when operating in the enhanced security mode of operation. Alternatively, the enhanced security mode of operation may cause an increase in the number of authorized user identification factors required to return to the normal mode of operation. In one or more embodiments, the electronic device may report this incident of being picked up by someone other than the authorized user to a cloud service.

In still another embodiment, the enhanced security mode of operation may disable user interface output devices of the electronic device while maintaining the operation of one or more input devices of the electronic device so that the nefarious actor taking the electronic device out of the geofence can be monitored. The one or more processors may cause the user interface and/or output devices of the electronic device to emulate a powered OFF state so that the bad guy fails to notice that he or she is being monitored. The one or more processors may also limit visibility of certain sensitive content in one or more embodiments.

In one or more embodiments, when the electronic device is operating in the enhanced security mode of operation, when the wrong user credentials are entered the electronic device enters an even higher security mode of operation. In another embodiment, when the electronic device is operating in the enhanced security mode of operation, when the wrong user credentials are entered the electronic device enters a hard lockdown mode. In one or more embodiments, the electronic device can transmit, across a network with a wireless communication circuit, data representations of the inputs captured of the nefarious actor, the incorrect credentials entered, or combinations thereof. In one or more embodiments, when operating in the enhanced security mode of operation the one or more processors of the electronic device limit content visibility.

Illustrating by way of another example, if the electronic device is configured as a television set, when the television set is installed at a particular location the one or more location detectors detect the location in response to cessation of physical contact and/or one or more motion detectors detecting a stationary state of the television set, such as after the authorized user has placed a newly purchased television on a desk in a room. Upon the owner of the television set authenticating his or her self to the one or more processors of the television, a geofence manager establishes a geofence about the location in response to the cessation of physical contact and/or one or more motion detectors detecting a stationary state of the television set. In one or more embodiments, there could be different levels of restrictions. For example, if the television is moved from room to room it may be treaded differently than when it is moved outside the home.

In one or more embodiments, if the television set is ever moved to a different location, which can be detected by the one or more motion sensors, or the location detector, or by the one or more processors when the television set is unplugged, the television set enters the enhanced security mode of operation and becomes disabled until the owner reauthenticates his or her self to the one or more processors at the new location. Advantageously, this functioning serves as a theft deterrent.

In one or more embodiments, the owner may authenticate his or her self to the one or more processors by way of setting up a password, or alternatively by entering a secret code supplied by the manufacturer that is stored at a location separate from the television set. In one or more embodiments, this secret code is required as the device boots up; without it, the device is useless. Alternatively, in another embodiment, the owner may authenticate his or her self to the one or more processors of the television set by delivering fingerprint data to a fingerprint sensor, or other biometric data to another biometric sensor.

Turning now to FIG. 1, illustrated therein is one explanatory method 100 in accordance with one or more embodiments of the disclosure. In a primary embodiment, the method 100 of FIG. 1 establishes a geofence 118 about a location 117 when an authorized user 113 puts down an electronic device 114 on a surface, e.g., on the table 115 of step 101, such as when the authorized user 113 puts the electronic device 114 on the table 115. However, in other embodiments, such as when the electronic device 114 is configured with touch or grip sensors, steps of the method 100 can be used to establish a geofence 118 when an authorized user 113 hands the electronic device 114 to another person, when the electronic device 114 is snatched out of the hands of the authorized user 113, such as when being stolen by a nefarious actor 120, or in other situations. Accordingly, while the method 100 is illustrated as establishing a geofence 118 when the authorized user 113 places the electronic device 114 down on a surface, it should be understood that the various steps of the method 100 can be applied to any number of situations in which the electronic device 114 leaves the presence of, or contact with, the authorized user 113.

At step 101, an authorized user 113 places an electronic device 114 on a table 115. In one or more embodiments, one or more sensors of the electronic device 114, described in more detail below with reference to FIG. 3, detect a cessation 116 of physical contact between the authorized user 113 of the electronic device 114 and the electronic device 114 when the electronic device 114 leaves the hand of the authorized user 113. Illustrating by example, one or more touch sensors of the electronic device 114 can detect the hand of the authorized user 113 releasing the electronic device 114 as it is placed on the table 115. Similarly, a touch-sensitive display of the electronic device 114 can detect the release of the hand as the authorized user 113 places the electronic device 114 on the table 115. In one or more embodiments, this state can be determined by a motion sensor such as an accelerometer. An imager of the electronic device 114 can capture images of the hand of the authorized user 113 releasing the electronic device 114. Similarly, a depth scanner of the electronic device 114, or alternatively a proximity detector of the electronic device 114, can detect the hand (or other body part) of the authorized user 113 moving away from the housing of the electronic device 114. Other techniques for detecting the cessation 116 of physical contact between the authorized user 113 and the electronic device 114 will be described below. Still others will be obvious to those of ordinary skill in the art having the benefit of this disclosure.

In one or more embodiments, one or more motion sensors of the electronic device 114 can optionally detect a stationary state of the electronic device 114, shown at step 101, to confirm that the electronic device 114 has indeed been put down on a surface, rather than placed in a moving object, such as a purse, briefcase, suitcase, car, or other object. As noted above, one or more embodiments of the disclosure establish a geofence 118 about a location 117 where an electronic device 114 is placed down by an authorized user 113, e.g., the table 115 of step 101, when the authorized user 113 puts the electronic device 114 on the table 115. By detecting whether the electronic device 114 is in a stationary state, this serves as an additional confirmation that the electronic device 114 has been placed on a surface. Where the one or more sensors of the electronic device 114 are detecting other geofence-establishing triggers, such as the authorized user 113 handing the electronic device 114 to another person, or when a nefarious actor 120 snatches the electronic device 114 from the hand or pocket of the authorized user 113, this step of detecting a stationary state may be omitted.

In one or more embodiments, one or more location detectors of the electronic device 114, also described in more detail below with reference to FIG. 3, determine a location 117 of the electronic device when the cessation 116 of the physical contact between the authorized user 113 of the electronic device 114 and the electronic device 114 occurs. In one or more embodiments, a geofence manager of the electronic device 114 establishes a geofence 118 about the location 117 in response to the cessation 116 of physical contact between the authorized user 113 of the electronic device 114 and the electronic device 114. Where the one or more motion sensors of the electronic device 114 optionally detect a stationary state of the electronic device 114, shown at step 101, to confirm that the electronic device 114 has indeed been put down on the table 115, the establishment of the geofence 118 about the location 117 occurs only where the one or more motion sensors of the electronic device 114 detect the stationary state in one or more embodiments.

The geofence 118 defines a virtual geographic boundary about the location 117 that can be sensed, measured, and/or detected by one or more sensors of the electronic device 114. For example, if the location 117 has geographic coordinates X and Y, with the geofence 118 having a predefined radius, such as thirty feet, the geofence 118 would define a virtual boundary configured as a circle about the location 117 with a diameter of sixty feet within which one or more processors of the electronic device 114 may operate the electronic device 114 in a first mode of operation. However, outside of the geofence 118 the one or more processors of the electronic device 114 may operate the electronic device 114 in a second mode of operation.

In the examples that follow, when the electronic device 114 is within the geofence 118, the one or more processors operate the electronic device 114 in a normal mode of operation. By contrast, when the electronic device 114 exits 119 the geofence 118, the one or more processors operate the electronic device 114 in an enhanced security mode of operation. Other modes of operation suitable for occurring within, or outside, the geofence 118 will be obvious to those of ordinary skill in the art having the benefit of this disclosure.

At decision 103, one or more processors of the electronic device 114 operable with the geofence manager, optionally by receiving signals from one or more motion sensors of the electronic device 114, a location detector of the electronic device 114, orientation sensors of the electronic device 114, radio-frequency signals via a wireless communication circuit of the electronic device 114, signals from other sensors of the electronic device 114, or by other techniques, determine whether the electronic device 114 is within the geofence 118. In one or more embodiments, where the electronic device 114 remains within the geofence 118, as shown in step 101, the one or more processors of the electronic device 114 operate the electronic device 114 in a normal mode of operation at step 104. However, when the electronic device 114 exits 119 the geofence 118, as shown in step 108 when a nefarious actor 120 who is not authorized to use the electronic device 114 is "making a break for it" and stealing the electronic device 114 form the table 115 while the authorized user 113 has temporarily stepped away, the one or more processors of the electronic device 114 operate the electronic device 114 in an enhanced security mode of operation at step 105.

Embodiments of the disclosure allow the authorized user 113 to disable the geofence 118 so that the electronic device 114 can be moved. For example, in one or more embodiments, when the authorized user 113 picks up the electronic device 114, the geofence 118 is removed. Said differently, in one or more embodiments, at step 106, one or more sensors of the electronic device 114 detect, while the electronic device 114 remains within the geofence 118, a recurrence of physical contact between a person an the electronic device 114. Decision 107 determines whether the person making physical contact with the electronic device 114 is an authorized user of the electronic device 114 by performing an authentication procedure.

Decision 107 can be performed in a variety of ways. These ways can include by delivery of a fingerprint image to a fingerprint sensor, by entry of a PIN code, by voice recognition, by iris scan, or by other techniques. In one or more embodiments, the authorized user 113 delivers a facial recognition input to an authentication system of the electronic device 114 for authentication at decision 107. The facial recognition input can comprise two-dimensional imaging, depth scan imaging, thermal sensing, optionally one or more higher authentication factors, or combinations thereof.

In one or more embodiments, as described in more detail below with reference to FIG. 3, the electronic device includes imager. The imager can capture at least one image of an object situated within a predefined radius of the electronic device 114. At step 101, this would result in the imager capturing an image of the authorized user 113.

In one embodiment, the imager captures a single image of the object. In another embodiment, the imager captures a plurality of images of the object. The electronic device 114 can be in communication with other devices such as Internet-of-Things (Internet-of-things) devices, which can cause another imager in the home to confirm a particular situation for example. In one or more embodiments, the one or more images are each a two-dimensional image. For example, in one embodiment the image is a two-dimensional RGB image. In another embodiment, the image is a two-dimensional infrared image. Other types of two-dimensional images will be obvious to those of ordinary skill in the art having the benefit of this disclosure.

In one or more embodiments, the image can be compared to one or more predefined reference images stored in memory of the electronic device 114. By making such a comparison, one or more processors disposed within the electronic device can confirm whether the shape, skin tone, eye color, hair color, hair length, and other features identifiable in a two-dimensional image are that of the authorized user 113 identified by the one or more predefined reference images.

In one or more embodiments, authentication system can further include a depth scanner (also described below with reference to FIG. 3). In one or more embodiments the depth scanner captures at least one depth scan of the object when situated within the predefined radius of the electronic device 114. In one embodiment, the depth scanner captures a single depth scan of the object. In another embodiment, the depth scanner captures a plurality of depth scans of the object.

The depth scanner can take any of a number of forms. These include the use of stereo imagers, separated by a predefined distance, to create a perception of depth, the use of structured light lasers to scan patterns—visible or not—that expand with distance or project different patterns, and that can be captured and measured to determine depth or projecting different patterns, time of flight sensors that determine how long it takes for an infrared or laser pulse to translate from the electronic device 114 to the authorized user 113 and back. Other types of depth scanners will be obvious to those of ordinary skill in the art having the benefit of this disclosure. However, in each case, the depth scan creates a depth map of a three-dimensional object, such as the face of the authorized user 113. This depth map can then be compared to one or more predefined facial maps stored in memory of the electronic device 114 to confirm whether the contours, nooks, crannies, curvatures, and features of the face are that of the authorized user 113 identified by the one or more predefined facial maps.

In one or more embodiments, the image and the depth scan are used in combination for authentication purposes at decision 107. This results in the number of authorized user identification factors (discussed more below with reference to step 110) required for authentication at decision 107 being two. In one or more embodiments one or more processors of the electronic device 114 compare the image with the one or more predefined reference images. The one or more processors then compare the depth scan with the one or more predefined facial maps.

In one or more embodiments, authentication at decision 107 will fail in one or more embodiments unless the image sufficiently corresponds to at least one of the one or more predefined images and the depth scan sufficiently corresponds to at least one of the one or more predefined facial maps. As used herein, "sufficiently" means within a predefined threshold. For example, if one of the predefined images includes five hundred reference features, such as facial shape, nose shape, eye color, background image, hair color, skin color, and so forth, the image will sufficiently correspond to at least one of the one or more predefined images when a certain number of features in the image are also present in the predefined images. This number can be set to correspond to the level of security desired. Some users may want ninety percent of the reference features to match, while other users will be content if only eighty percent of the reference features match, and so forth.

As with the predefined images, the depth scan will sufficiently match the one or more predefined facial maps when a predefined threshold of reference features in one of the facial maps is met. In contrast to two-dimensional features found in the one or more predefined images, the one or more predefined facial maps will include three-dimensional reference features, such as facial shape, nose shape, eyebrow height, lip thickness, ear size, hair length, and so forth. As before, the depth scan will sufficiently correspond to at least one of the one or more predefined facial maps when a certain number of features in the depth scan are also present in the predefined facial maps. This number can be set to correspond to the level of security desired. Some users may want ninety-five percent of the reference features to match, while other users will be content if only eighty-five percent of the reference features match, and so forth.

The use of both the image and the depth scan as combined authentication factors at decision 107, as well as in the initial authentication process occurring at step 101 described above, can be preferable to using one or the other alone, as the depth scan adds a third "z-dimension" to the x-dimension and y-dimension data found in the image, thereby enhancing security. Another benefit of using the depth scan in conjunction with the image at decision 107 or step 101 is the prevention of someone "faking" the imager acting alone by taking an image of a picture of the authorized user 113, rather than the authorized user 113 attempting to authenticate his or her self personally.

Where the person moving the electronic device 114 is authenticated as being the authorized user 113 of the electronic device 114 at decision 107, the method 100 moves to step 109 where the geofence manager terminates the geofence 118 about the location 117 in response to the authorized user 113 picking up the electronic device 114, i.e., in response to the recurrence of physical contact between the authorized user 113 of the electronic device 114 and the electronic device 114. Thus, if the authorized user 113 "grabs" the electronic device 114 and moves it to another location on the table 115, for example, the geofence manager terminates the original geofence 118 and then establishes another geofence when the electronic device 114 is placed down again. This allows the authorized user 113 to establish a geofence 118 by simply putting an electronic device 114 down on a surface, and terminate the geofence 118 simply by picking the electronic device 114 back up (presuming authentication as the authorized user of the electronic device 114 at decision 107).

Said differently, where decision 107 authenticates the person as the authorized user of the electronic device 114, i.e., where the one or more sensors of the electronic device 114 detect a recurrence of the physical contact between the authorized user 113 of the electronic device 114 and the electronic device 114, the method 100 moves to step 109 where the geofence manager of the electronic device 114 terminates the geofence 118 about the location 117 in response to the recurrence of the physical contact between the authorized user 113 of the electronic device 114 and the electronic device 114. Thus, when the authorized user 113 picks the electronic device 114 up off the table 115 and moves the electronic device 114, in one or more embodiments the geofence manager terminates the geofence 118 about the location 117 in response to the authorized user 113 grasping the electronic device 114. This allows the authorized user 113 to move the electronic device 114, with another geofence 118 being again established when the authorized user 113 puts the electronic device 114 down again.

However, in one or more embodiments when the authentication of decision 107 fails, for whatever reason, which would be the case at step 108 due to the nefarious actor 120 stealing the electronic device 114 and not being authorized to use the same, the method 100 moves to step 105 (due to the electronic device 114 having exited 119 the geofence 118) where the one or more processors of the electronic device 114 cause the electronic device 114 to enter the enhanced security mode of operation.

Thus, when an unauthorized user of the electronic device 114, e.g., the nefarious actor 120 of step 108, moves the electronic device 114 as shown in step 108, the geofence 118 remains stationary about the location 117. When the electronic device 114 exits 119 the geofence 118, the one or more processors of the electronic device 114 cause the mode of operation to switch from the normal mode of operation to the enhanced security mode of operation at step 105.

In one or more embodiments, when operating in the enhanced security mode of operation, the one or more processors of the electronic device 114 may require a reauthorization of the authorized user 113 of the electronic device 114. Illustrating by example, when the electronic device 114 is operating in the enhanced security mode of operation, as shown at step 105, decision 107 may require a reauthorization of the authorized user 113 before returning to the normal mode of operation at step 104.

In one or more embodiments, when operating in the enhanced security mode of operation, the one or more processors can lock or limit full access the electronic device 114 at step 112 to preclude access to it or the information stored therein. For example, the one or more processors can lock the electronic device 114 at step 112 to preclude access to it or reduce access or the information stored therein when operating in the enhanced security mode of operation. When the electronic device 114 is in the enhanced security mode of operation, the one or more processors may then require additional authorized user identification factors at step 110 beyond the image or the depth scan to authenticate a person as the authorized user of the electronic device 114 at the next authentication cycle, one of which is shown at decision 111.

In one or more embodiments, when operating in the enhanced security mode of operation at step 105, the one or more processors can disable one or more features of the electronic device 114. For example, applications using personal information, such as financial applications, health applications, fitness applications, diet applications, email applications, social media applications, text applications, and the like may be disabled. Generic applications, such as a clock, weather application, or web browser may remain operational in the enhanced security mode of operation.

Various control functions, many of which will be described in more detail below with reference to FIGS. 6-7, can be performed when the one or more processors operate the electronic device 114 in the enhanced security mode of operation. For example, in one or more embodiments, when the authentication fails at decision 107, for whatever reason, and the electronic device 114 has exited 119 the geofence 118, the one or more processors can disable user interface output devices of the electronic device 114 while keeping one or more input devices of the electronic device 114 operational at step 112. Examples of user interface output devices include one or more of visual output devices, audio output devices, haptic output devices, or combinations thereof. Still other examples of user interface output devices will be obvious to those of ordinary skill in the art having the benefit of this disclosure. Examples of input devices include one or more of an imager, a microphone, a geo-locator, a wireless communication circuit, a motion detector, or combinations thereof. This action allows the electronic device 114 to emulate a powered OFF state while still monitoring an environment of the electronic device 114 with the operational input devices. In one or more embodiments, this disablement of the user interface output devices comprises disabling comprises disabling all user interface output devices of the electronic device 114. Examples of these modes will be described in more detail below with reference to subsequent figures.

In one or more embodiments, when operating in the enhanced security mode of operation, the one or more processors of the electronic device 114 require reauthorization of a person as the authorized user of the electronic device 114 at step 110. In one or more embodiments, when operating in the enhanced security mode of operation, step 110 comprises increasing a number of authorized user identification factors required for the one or more processors of the electronic device 114 to return the electronic device 114 to the normal mode of operation. Illustrating by example, while a facial depth scan and/or captured image may have been the only authorized user identification factor required to authenticate the authorized user 113 of the electronic device 114 at step 101, in one or more embodiments step 110 requires this base level authorized user identification factor plus at least one additional authorized user identification factor.

Figure 2:
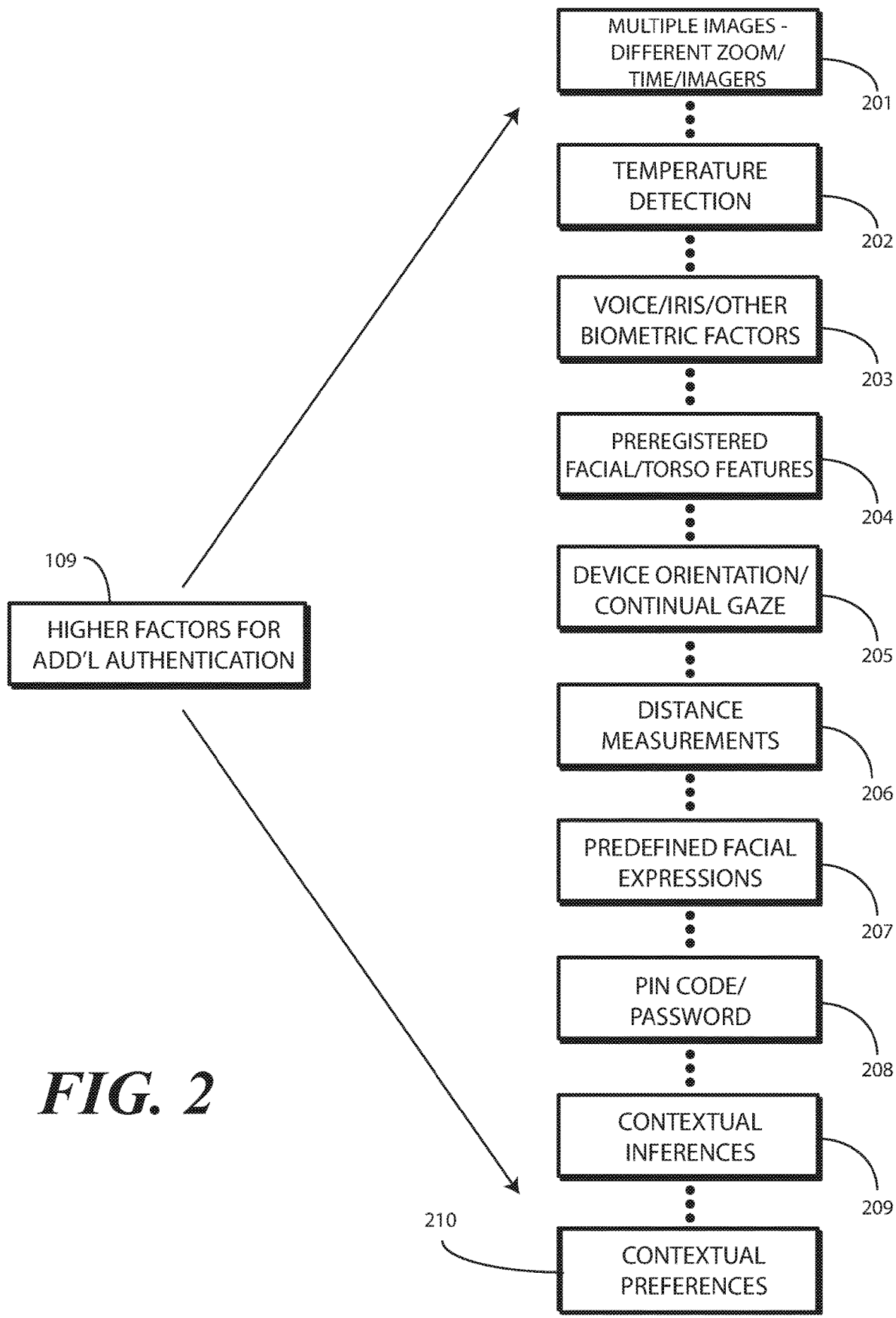
FIG. 2 illustrates one or more authentication factors suitable for use by an electronic device in accordance with one or more embodiments of the disclosure.

Turning briefly to FIG. 2, illustrated therein are examples of additional authorized user identification factors that may be required at step 110 when the electronic device (114) is operating in the enhanced security mode of operation. In one or more embodiments, a first higher authentication factor 201 comprises capturing multiple images or multiple facial depth scans with different fields of view. Illustrating by example, in one or more embodiments at least a first image of a plurality of images is captured with a first field of view, while at least a second image of the plurality of images is captured with a second field of view. In one or more embodiments, the first field of view and the second field of view are different. For example, the first field of view may be wider than the second field of view. Such differing fields of view allow some images to be used, for example, for facial recognition, while other images can be used to determine, for example, whether a person is touching the electronic device (114). Similarly, the differing fields of view can be used to perform facial recognition with some images, and iris scans with others, and so forth.

The first higher authentication factor 201 may also comprise a plurality of images and/or a plurality of facial depth scans across time, and performing additional authentication processes using each of these images and/or depth scans. When this occurs, frame rates can be triggered based upon variable criteria. For example, the frame rate to assess identity could be increase during motion and be reduced during stationary or motionless periods to conserve power. The frame rate can also be driven by lighting levels, with darkness triggering re-authentication and setting frame rate for best match. Additionally, reauthentication can be triggered by device motion. If, for example, the electronic device (114) is placed on a table (115), re-authentication can be triggered when the electronic device (114) is picked up. Regardless of what form it takes, "continuous" authentication and/or re-authentication can optionally be implemented to ensure that the authorized user (113) is using the electronic device (114) after the electronic device (114) is moved.

The first higher authentication factor 201 can also comprise capturing multiple images and/or depth cans with multiple imagers and/or multiple facial depth scanners performing additional authentication processes using each of these images and/or depth scans. This allows for the higher security authentication to occur from different angles and perspectives, further increasing robustness and ensuring additional operational access to the electronic device (114)

only be granted when it is assured that a user using the electronic device (114) is the authorized user (113).

A second higher authentication factor 202 can comprise temperature. In one or more embodiments, the electronic device (114) can include a temperature sensor that detects a temperature of the person or a thermal image of the person. In one or more embodiments, authentication of an authorized user may only occur when the temperature obtained is within a predefined range. In one or more embodiments, this predefined range is between 95 and 102 degrees Fahrenheit. Other predefined temperature ranges corresponding to human body temperatures will be obvious to those of ordinary skill in the art.

A third higher authentication factor 203 can comprise a biometric factor. Examples of biometric factors include voiceprints, iris scans, retinal scans, fingerprints, or other biometric data. Biometric factors could also include receiving fingerprint data from different fingers. Confirmation that a person is an authorized user of the electronic device (114) may only occur when these biometric data sufficiently matches one or more predefined authentication references.

In one or more embodiments, the at least one additional authentication factor comprises audio input received from the object, such as the voiceprint. In one or more embodiments, when the at least one additional authentication factor fails to sufficiently correspond to the at least one of the one or more predefined authentication references, another biometric sensor can be actuated as a "double check," such as an iris scanner.

A fourth higher authentication factor 204 can include identifying preregistered facial features. Characteristics such as a bent nose, scar, mole, beard, or tattoo can be preregistered in memory. Similarly, a user can store one or more predefined facial features such as hair color, eye color, skin color, head-to-neck size or diameter ratio, neck-to-body size or diameter ratio, location history, and so forth. Authentication of a person as an authorized user of the electronic device (114) may only occur when one or more of these predefined facial features sufficiently match predefined criteria or predefined authentication references in one or more embodiments. For a person may be authenticated as the authorized user of the electronic device (114), for example, when one or more facial features sufficiently match one or more predefined facial features stored within a memory of an electronic device.

In one or more embodiments, if the additional authentication input(s) fail to sufficiently match the authentication reference(s), the electronic device can actuate a high confidence authenticator, such as the biometric scanner of the fourth higher authentication factor 204. For example, the iris scanner can be triggered to verify with a high degree of confidence that the user is indeed the authorized user of the electronic device (114). In one or more embodiments, when the imager determined that the person is in an optimal position for an iris scan, the one or more processors can actuate the iris scanner and proactively make the scan the authentication system has not already authenticated at a highest level. In one or more embodiments, once the highest level of authentication has been reached, the person can launch any application, including high security applications.

The fourth higher authentication factor 204 can also include a torso feature. This can include, for example, whether a person is physically touching the device or where the person is located, e.g., near a predefined wall, landmark, house, carrying a wallet, holding a picture, or situated next to other person. Authentication of a person as an authorized user of the electronic device (114) may only occur when one or more torso features sufficiently match one or more predefined torso features stored within a memory of an electronic device.

A fifth higher authentication factor 205 can be device orientation and/or continual gaze detection. If, for example, an orientation detector detects whether the device is oriented so as to capture a "selfie" rather than an image from the rear imager, this may confirm that the device is pointing in the direction of the authorized user, thereby confirming that the person is indeed an authorized user of the electronic device (114). By contrast, capturing a rearward shot would leave the electronic device (114) in the enhanced security mode of operation, such as by locking the electronic device (114), disabling one or more features of the electronic device (114), limiting access to content in the electronic device (114) or performing other control operations.

The use of the fifth higher authentication factor 205 advantageously prevents someone from grabbing an electronic device, pointing its imager at the user, and running away with access to the private and sensitive information stored within the electronic device. Thus, in one or more embodiments where an orientation of the electronic device is determined, authentication of a person as the authorized user of the electronic device (114) may only occur when the orientation matches one or more predefined orientation criteria, such as the user capturing a selfie.

In one or more embodiments, if the additional authentication input(s) fail to sufficiently match the authentication reference(s), one or more processors of the electronic device (114) can actuate a high confidence authenticator, such as an iris scanner or Personal Identification Number (PIN) code entry application, to verify with a high degree of confidence that the user is indeed the authorized user of the electronic device (114). In one or more embodiments, if voice authentication did not confirm the user's identity sufficiently, or pointed to a different user, the authentication system of the electronic device (114) can ask for further authentication inputs to be delivered or can limit operational access to the electronic device (114) by leaving the electronic device (114) in the enhanced security mode of operation.

A sixth higher authentication factor 206 includes a distance measurement. In one or more embodiments, a predefined distance at which the image, depth scan, and temperature measurement are made can be required. For example, in one or more embodiments where the image, depth scan, and temperature are not captured within a predefined distance range, such as between a distance of one and two feet, the one or more processors of the electronic device (114) leave the electronic device (114) in the enhanced security mode of operation.

A seventh higher authentication factor 207 includes predefined miens. A "mien" is a predefined look or manner of a person, which can be expressed by making a particular face or taking a particular pose. For example, a person may adopt a mien by blowing out their cheeks, placing a finger on a cheek, sticking out their tongue, pinching their lip, frowning, and so forth. Illustrating by example, in one embodiment a person may express a mien by pulling on an ear with a hand. In one or more embodiments where a predefined mien is expressed, this serves as an additional factor ensuring that the person expressing the mien is indeed an authorized user of the electronic device (114).

An eighth higher authentication factor 208 can include a PIN code or password. In one or more embodiments, authentication of a person as an authorized user of the electronic device (114) may only occur when a user enters a PIN code or password. In other embodiments, such as when one or more of the higher authentication steps fail, one or more processors can prompt for one or more of a personal identification number or password.

A ninth higher authentication factor 209 can include contextual inferences. This can include, for example, differences between images captured by the front imager and the second imager. If, for instance, the front and rear imagers show only one person nearby, this provides additional confidence in ensuring that the authenticated user is indeed the authorized user of the electronic device (114). However, if another person is in the picture in addition to the user, the one or more processors of the electronic device (114) may leave the electronic device (114) in the enhanced security mode of operation due to the fact that there is a possibility that a fakir is holding the device in front of the authorized user in an attempt to convert the electronic device (114) from the enhanced security mode of operation back to the normal mode of operation.

Thus in one embodiment a number of people present in the at least a first image and the at least a second image is determined, and authentication of a person as an authorized user of the electronic device (114) occurs only when a single person is present in the at least a first image and the at least a second image. Alternatively, under those conditions, system might require the user to enter a code or touch the fingerprint sensor to be authenticated as the authorized user of the electronic device (114).

Location can also serve as a contextual inference. For example, if authentication is occurring at a new and strange area (explained in more detail below with reference to FIG. 5) where the electronic device (114) has never been, this could increase the number of higher authentication factors required in comparison to authentication occurring in a trusted location, such as the user's home.

A tenth higher authentication factor 210 can include user preferences, or contextual definitions provided by a user. Examples of these include whether the user is walking, laying down, sitting, looking to the side, resting face on hand, or has their hair brushed in a certain way.

Turning now back to FIG. 1, in the situation where the nefarious actor 120 is making away with the electronic device 114, as shown at step 108, the nefarious actor 120 will not be authenticated as the authorized user of the electronic device 114 at decision 111. Where this occurs, i.e., where the electronic device 114 has exited 119 the geofence 118 and the person causing the electronic device 114 to exit 119 the geofence 118 is someone other than the authorized user 113 of the electronic device 114, as determined at decision 111, the method 100 moves to step 112 where one or more control operations are performed.

In a simple embodiment, step 112 merely locks the electronic device 114. Accordingly, the nefarious actor 120 will not have access to any data, applications, content, or features of the electronic device 114. However, many other control operations could be performed at step 112 as well.

Figure 6:
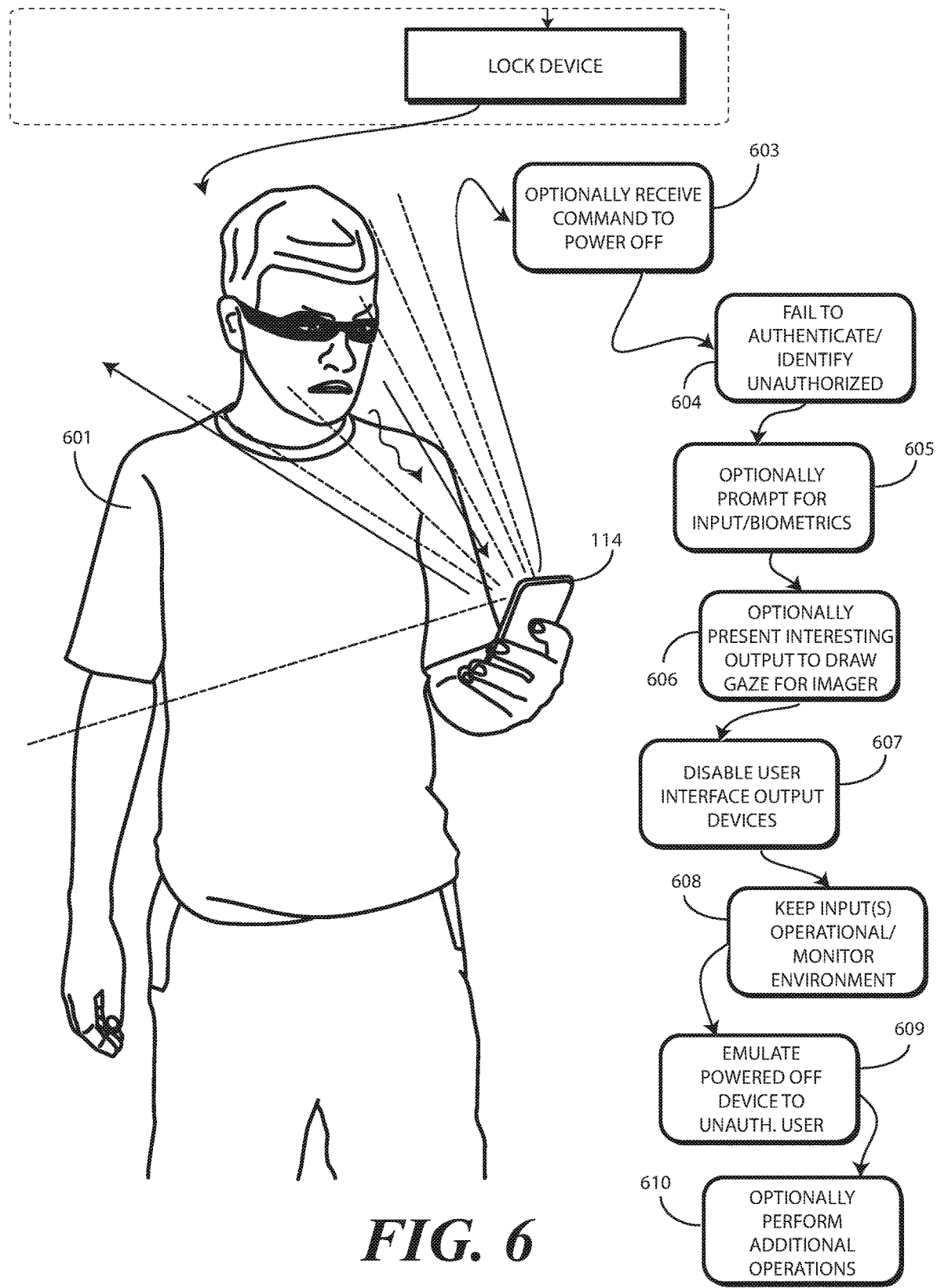
FIG. 6 illustrates yet another explanatory method in accordance with one or more embodiments of the disclosure.
Figure 7:
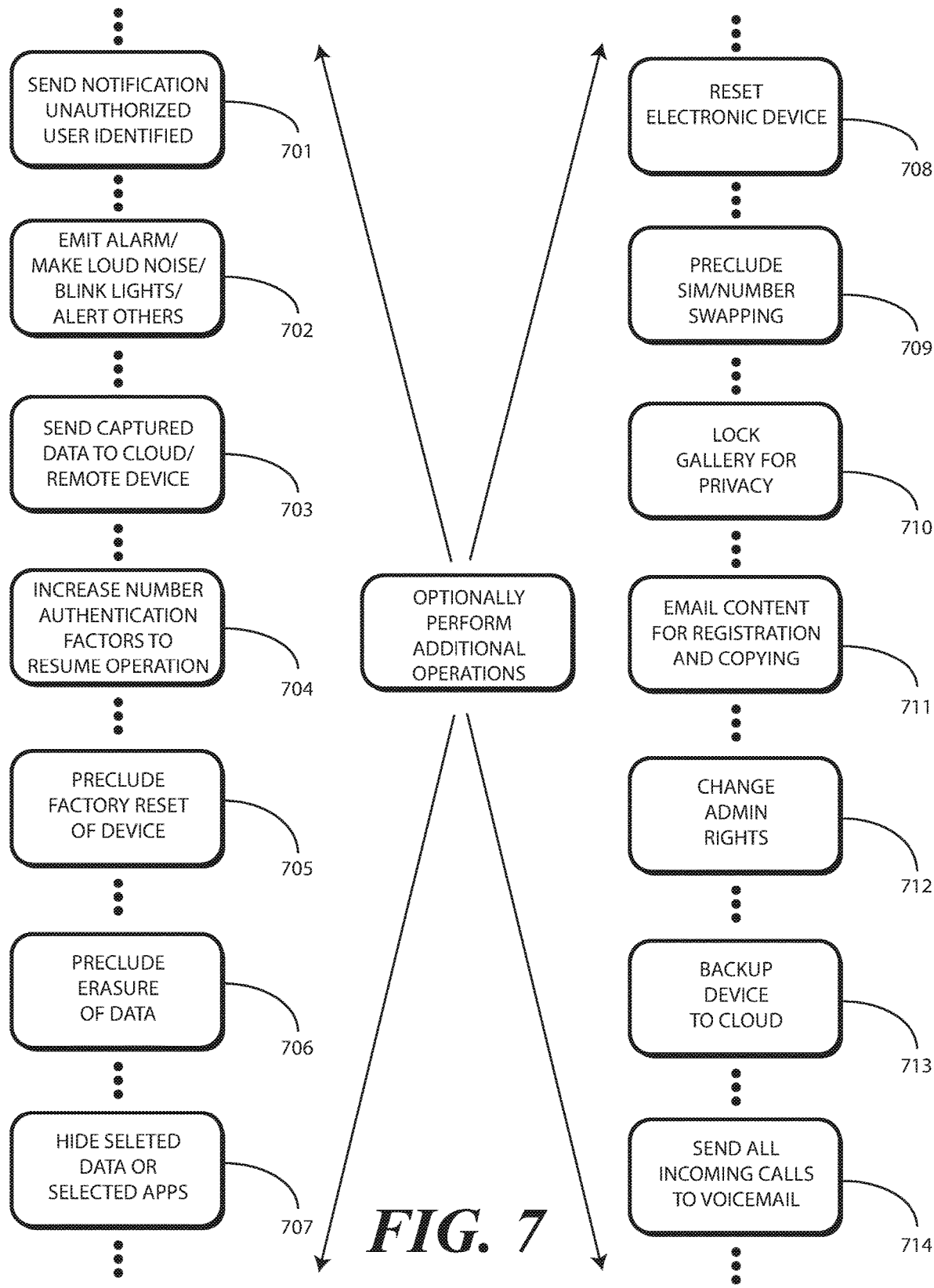
FIG. 7 illustrates one or more explanatory control operations that an electronic device configured in accordance with one or more embodiments of the disclosure can perform when operating in an enhanced security mode of operation.

Turning now to FIGS. 6-7, illustrated therein are several explanatory control operations that can be performed at step 112. These are illustrative only, as numerous others will be obvious to those of ordinary skill in the art having the benefit of this disclosure.

Beginning with FIG. 6, a miscreant 601 has gained possession of the electronic device 114 via theft, taking the electronic device 114 outside the geofence (118) established using the method (100) of FIG. 1. The miscreant 601 is, therefore, definitely not an authorized user of the electronic device 114.

As shown in FIG. 6, in an effort not to be tracked by the electronic device 114, and potentially to silence the screaming alarm being emitted due to the fact that the electronic device 114 is operating in the enhanced security mode of operation outside the geofence (118), the miscreant 601 is delivering a command 603 to power OFF the electronic device 114. In one or more embodiments when the electronic device 114 is operating in the enhanced security mode of operation, when this occurs the one or more processors (305) of the electronic device 114 attempt to authenticate the miscreant 601 as an authorized user of the electronic device 114 (as described above with reference to decision 111 of FIG. 1). Embodiments of the disclosure also contemplate that history can lay a role. For example, a repeated device left behind at a repeated, known location can cause the electronic device 114 to enter a locked mode of operation. The electronic device 114 can have subclasses of locked modes of operation, with the understanding that the authorized user is constantly leaving the electronic device 114 at a very well known location with known people and friends, as detected by a location detector and registered devices with signatures situated around the electronic device 114.

At step 604, the one or more processors (305) of the electronic device 114 fail to identify the authorized user of the electronic device 114. In the illustrative embodiment of FIG. 6, this is true because the miscreant 601 is not the authorized user. Accordingly, by receiving the facial recognition input, the one or more processors (305) of the electronic device 114 positively confirm that an unauthorized user is holding the electronic device 114 while the electronic device 114 operates in the enhanced security mode of operation.

In one or more embodiments, anytime there is a failure to authenticate an authorized user when the electronic device 114 is operating in the enhanced security mode of operation, the one or more processors (305) disable user interface output devices while keeping one or more input devices operational. In one or more embodiments, when the electronic device 114 is in the powered OFF emulation mode, it is still possible for the authorized user to then be authenticated.

In this illustrative example, however, the miscreant 601 is holding the electronic device 114 and is outside the geofence (118). Accordingly, upon failing to identify the authorized user of the electronic device 114, at step 607 the one or more processors (305) of the electronic device 114 disable user interface output devices of the electronic device while, at step 608, keeping one or more input devices of the electronic device 114 operational. This allows the one or more processors (305) of the electronic device 114 to monitor, at step 608, with one or more input devices, one or more inputs from an environment of the electronic device 114.

The execution of steps 607,608 result in the electronic device 114 emulating, at step 609, emulating, with the user interface (303) of the electronic device 114, a powered OFF state of the electronic device 114. Step 609 can further include precluding, with the one or more processors (305), enabling the user interface output devices until the authorized user is authenticated. Step 609 can include precluding, with the one or more processors (305), erasure of data stored in a memory (306) of the electronic device 114. Step 609 can include precluding, with the one or more processors (305), a factory reset of the electronic device 114. These steps can be performed in combination or individually. Other options suitable for inclusion with step 609 will be obvious to those of ordinary skill in the art having the benefit of this disclosure.

Prior to these steps 607,608 occurring, optional intermediate steps can be performed as well, as described above with reference to step (110) of FIG. 10. For instance, at optional step 605 the one or more processors (305) of the electronic device 114 can prompt, on a display (304) of the electronic device 114, for biometric input before executing steps 607,608,609.

At optional step 606, the one or more processors (305) of the electronic device 114 can optionally deliver an output to the miscreant 601 in an attempt to make the miscreant 601 look at the electronic device 114 so that facial recognition input—or other biometric input—can be captured by the electronic device 114. The output can be a presentation of an image or animation on the display (304) of the electronic device 114, delivery of audio signals to an audio output device of the electronic device 114, delivery of haptic or tactile output to a housing of the electronic device 114, or other output that can be perceived by the miscreant 601. In one or more embodiments, delivery of this output can occur until the imager (315) of the electronic device 114 captures a captured image of a source, here the miscreant 601, so that the image can be forwarded to the proper authorities.

Turning to FIG. 7, illustrated therein are a few of the possible additional operations that can be performed at step (112) of FIG. 1. Again, these are illustrative only, as numerous others will be obvious to those of ordinary skill in the art having the benefit of this disclosure.

At 701, the additional operations can include sending a notification that an unauthorized user has been positively confirmed as transferring the electronic device (114) beyond the perimeter boundary defined by the geofence (118). At 702, the additional operations can include causing the electronic device (114) to emit an alarm, such as outputting a loud, screaming or siren noise, upon exiting (119) the geofence (118). In the example of FIG. 1 above, had the authorized user (113) been sitting at the table (115) and not noticed the nefarious actor (120) stealing the electronic device (114), such an emission of noise from the electronic device (114) upon exiting the geofence (118) may have allowed the authorized user (113) to tackle or otherwise catch and take down the nefarious actor (120), thereby retrieving the electronic device (114).

When an electronic device is stolen, i.e., where an unauthorized user takes the electronic device (114) outside of the geofence (118), one or more processors of the electronic device (114) may use the wireless communication circuit to transmit a wireless communication to another electronic device belonging to the authorized user (113) of the electronic device (114) apparently being stolen. This wireless communication can identify the fact that an unauthorized user has possession of the electronic device and has taken it outside the geofence (118). The message may include other information, such as an image of the unauthorized user, a location of the electronic device (114), sounds recorded by the one or more microphones of the electronic device (114), or other data. This alerts the authorized user to the fact that the electronic device (114) may have been stolen, thereby facilitating easier and quicker recovery of the same.

At the same time, if the failure to identify the authorized user was due to reasons other than an unauthorized user having access to the electronic device (114), such a notification can be beneficial as well. If it was due to the fact that there was an unavoidable failure to capture the necessary information about the authorized user (113), in one or more embodiments the authorized user (113) could disable the enhanced security mode of operation by reauthenticating his or her self, such as by entering one of the higher authentication factors described above with reference to step (110) of FIG. 1.

At 703, the additional operations can include transmitting, across a network with a wireless communication circuit of the electronic device (114), data representations of the one or more inputs to a remote electronic device. In one or more embodiments, when the electronic device (114) is operating in the enhanced security mode of operation, one or more processors of the electronic device (114) can cause one or more input devices to monitor one or more inputs from an environment of the electronic device. Data representations, such as images, video files, audio files, location information, weather information, motion, and so forth, can then be transmitted to a remote electronic device such as an alternate electronic device belonging to the authorized user (113) or a cloud-computing device.

At 704, the additional operations can include increasing a number of authorized user identification factors required to transition the electronic device (114) from the enhanced security mode of operation to the normal mode of operation. Many of these factors have been described above with reference to step (110) of FIG. 1 and FIG. 2. However, to illustrate by way of an additional example, if a facial scan is all that is typically required to authenticate a person as an authorized user of the electronic device (114), when applying additional authorized user identification factors the one or more processors may require a facial scan, fingerprint, and personal identification number (PIN) code before transitioning the electronic device (114) out of the enhanced security mode of operation and back to the normal mode of operation. Alternatively, the one or more processors may cease the enhanced security mode of operation and return to the normal mode of operation if the authorized user (113) delivers a facial scan while at an identified owner location, such as in front of his vehicle license plate or in his living room. Other examples of elevating the number of authorized identification factors will be obvious to those of ordinary skill in the art having the benefit of this disclosure.

At 705, the additional operations can include preclusion of the ability to perform a factory reset of the electronic device (114). At 706, the additional operations can include preclusion of the ability to erase data. For example, when the electronic device (114) is in the enhanced security mode of operation and exits (119) the geofence (118) while in physical contact with an unauthorized user, in one or more embodiments the "erase data" function selection can be removed. In an alternate embodiment, is the erase function is one or more of removed, made invisible, or made to disappear, and thus no longer a selectable item unless identity is confirmed to be authorized.

At 707, if an unauthorized user causes the electronic device (114) to exit (119) the geofence (118) while the electronic device (114) is in the enhanced security mode of operation, certain applications become invisible. These include applications such as a gallery application, a phone application, an email application, a device usage history application, and so forth. Such applications can be selected in advance using a menu during device setup.

At 708, the additional operations can include causing an automatic reset of the electronic device (114). In some situations, an authorized user (113) may have the electronic device (114) fully backed up to the cloud or another electronic device, and may want the electronic device (114) to be completely "wiped" when stolen, understanding that they can simply restore their content, data, applications, and the like if the electronic device (114) is recovered. Accordingly, in one or more embodiments when if an unauthorized user causes the electronic device (114) to exit (119) the geofence (118) while the electronic device (114) is in the enhanced security mode of operation, one or more processors of the electronic device (114) cause a factory reset to occur.

At 709, the additional operations can include precluding the replacement of any unique identifiers associated with the electronic device (114), such as the data carried by a subscriber identification module (SIM) card, the international mobile equipment identity (IMEI), the mobile telephone number, and so forth. In one or more embodiments, if an unauthorized user causes the electronic device (114) to exit (119) the geofence (118) while the electronic device (114) is in the enhanced security mode of operation, the one or more processors of the electronic device (114) prevent SIM or number swapping.

At 710, the additional operations can include locking a gallery, such as a contact list, photo gallery, music collection, video collection, or other group of content items, to protect the privacy of the authorized user (113). In one or more embodiments, if an unauthorized user causes the electronic device (114) to exit (119) the geofence (118) while the electronic device (114) is in the enhanced security mode of operation, the one or more processors of the electronic device (114) lock, or limit access to, any such gallery to prevent any nefarious actor (120) from compromising the privacy of the authorized user (113).

At 711, the additional operations can include a wireless communication circuit of the electronic device (114) sending an electronic mail to an authorized user for registration and copying. At 712, the additional operations can include changing the admin rights of the electronic device (114). At 713, the additional operations can include automatically backing up data stored in the electronic device (114) to the cloud. At 714, the additional operations can include the one or more processors of the electronic device (114) sending all incoming calls to voicemail. Accordingly, if an unauthorized user causes the electronic device (114) to exit (119) the geofence (118) while the electronic device (114) is in the enhanced security mode of operation, the one or more processors can perform any of the operations set forth in 711-714, alone or in combination.

As noted above, FIG. 7 illustrates only some of the possible additional operations that can occur. Still others will be obvious to those of ordinary skill in the art having the benefit of this disclosure. Illustrating by example, in one or more embodiments if the battery of the electronic device becomes depleted, the electronic device will default to the powered OFF emulation mode when coupled to a charger. Additionally, in one or more embodiments to further conserve power, transmission of representations of captured data to remote electronic devices or the cloud will be restricted to times when the electronic device is coupled to a charger. Embodiments of the disclosure contemplate that a thief or other miscreant may attempt to charge the electronic device at some point.

Figure 8:
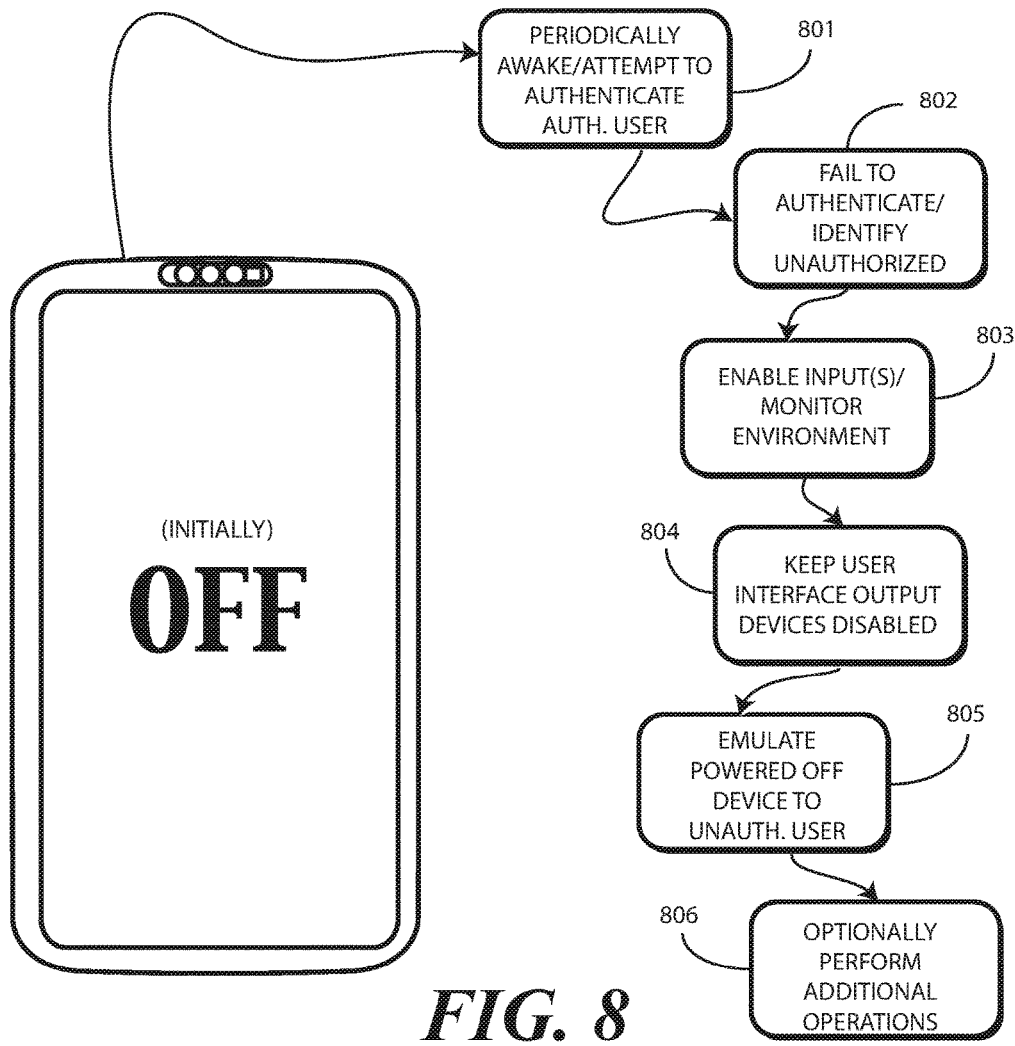
FIG. 8 illustrates one or more explanatory method steps that an electronic device can perform when operating in an enhanced security mode of operation in one or more embodiments.

Turning now to FIG. 8, as noted above, embodiments of the disclosure contemplate that the electronic device 114 can be taken outside of a geofence (118) established by a geofence manager (308), while powered OFF. In FIG. 8, a command to power OFF the electronic device 114 was received from an authorized user after the geofence manager (308) established the geofence (118). Accordingly, the embodiment of FIG. 8 presumes that the electronic device 114 was taken beyond the perimeter of the geofence (118) while powered OFF.

Embodiments of the disclosure still allow for operation of the electronic device 114 in the enhanced security mode of operation despite the fact that it was powered OFF when taken from beyond the boundary of the geofence (118). For example, at step 801 the one or more processors (305) can operate the electronic device 114 in the enhanced security mode of operation by periodically waking to perform environmental monitoring by making operational one or more user input devices. One of the monitoring operations includes attempting to identify an authorized user of the electronic device 114.

At step 802, while operating in the enhanced security mode of operation, the one or more processors (305) of the electronic device 114 may fail to identify the authorized user of the electronic device 114 because a malfeasant has possession of the electronic device 114. Where this occurs, step 803 can comprise enabling one or more input devices and monitoring an environment of the electronic device 114 when in the enhanced security mode of operation. Step 804 can comprise maintaining the disabled state of the user interface output devices, as was the case in the powered OFF state, thereby emulating the powered OFF state at step 805.

Step 803 can also include gathering information, attempting to identify persons within the environment of the electronic device, delivering data representations of the one or more environmental inputs received to a remote electronic device, and so forth. In the illustrative embodiment of FIG. 8, this occurs even when the authorized user initially powered OFF electronic device 114.

In this mode, the one or more processors can detect whether an unauthorized user has somehow taken control of the electronic device 114 while powered OFF. Moreover, this operational state could continue so long as there was sufficient battery capacity. This mode of operation advantageously allows the one or more processors to determine if an unauthorized user has taken control of the electronic device 114. Optionally, at step 806, the electronic device 114 can perform other operation such as notifying the authorized user and/or have the authorized user communicate with the electronic device 114 via the cloud.

As noted above, FIG. 1 illustrates a primary embodiment where the method (100) establishes a geofence (118) about a location (117) where cessation of physical contact between the authorized user (113) and the electronic device 114 is detected. The method (100) of FIG. 1 can thus be used to generate a geofence (118) when an electronic device 114 is placed down by an authorized user (113) on a surface, when the authorized user (113) gives the electronic device 114 to another person, or when a miscreant (601) takes the electronic device 114 from the authorized user (113).

However, in other embodiments, a geofence (118) is established every time an authorized user (113) is authenticated. In such an embodiment, the location detectors of the electronic device 114 determine the location of authentication of the authorized user (113). If the electronic device 114 moves beyond a certain radius, the electronic device 114 is locked and the authorized user (113) must reauthenticate his or her self. If the authorized user (113) is in a vehicle, such as may be determined by motion sensing, location sensing, velocity of movement, or other techniques, in one or more embodiments the one or more processors of the electronic device 114 require reauthentication only when the authorized user (113) leaves the vehicle, which can be detected by a motion sensor detecting a walking motion for example. In one or more embodiments, a reassessment of user identify can be triggered at or around the time the electronic device 114 is detected being near the border of the geofence (118).

Figure 4:
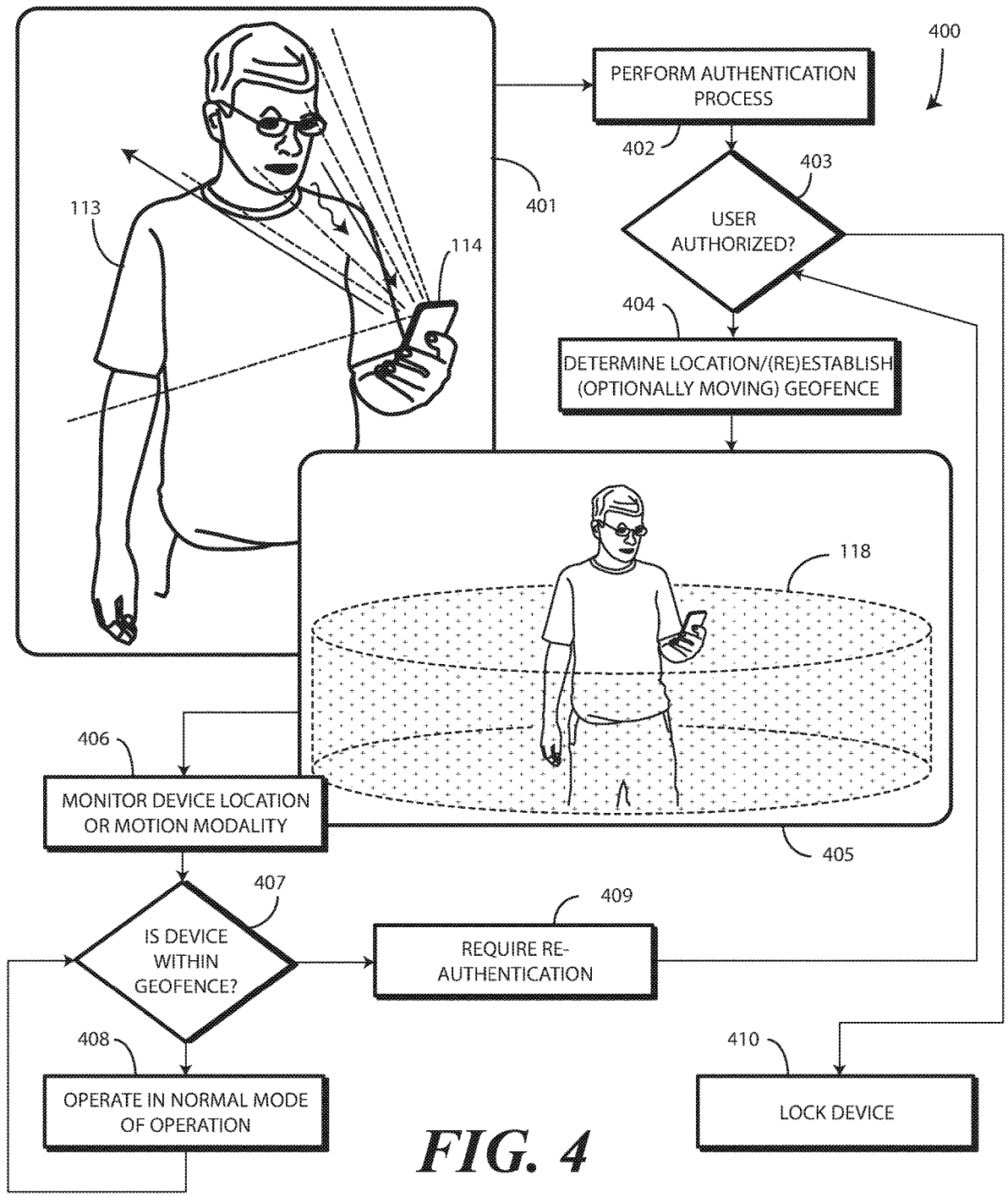
FIG. 4 illustrates another explanatory method in accordance with one or more embodiments of the disclosure.

Turning now to FIG. 4, illustrated therein is one example of this alternate method 400. In contrast to the method (100) of FIG. 1 above, where the geofence manager of the electronic device 114 established a geofence 118 in response to the cessation of physical contact between the authorized user 113 and the electronic device 114, in the embodiment of FIG. 4 the one or more processors of the electronic device 114 cause the geofence manager of the electronic device 114 to establish the geofence 118 in response to authenticating the authorized user 113.

At step 401, the electronic device 114 attempts to authenticate a person as an authorized user 113 of the electronic device 114 in accordance with one or more embodiments of the disclosure. As described above, authentication can occur in a variety of ways. These ways can include by delivery of a fingerprint image to a fingerprint sensor, by entry of a PIN code, by voice recognition, by iris scan, or by other techniques. In this illustrative embodiment, the authorized user 113 is delivering a facial recognition input to an authentication system of the electronic device 114 to authenticate his or her self as an authorized user 113 of the electronic device 114. The facial recognition input can comprise two-dimensional imaging, depth scan imaging, thermal sensing, optionally one or more higher authentication factors, or combinations thereof, as will be described in more detail with reference to FIG. 3 below.

In this illustrative embodiment, the authentication system comprises an imager that captures at least one image of an object situated within a predefined radius of the electronic device 114, which in this case is the authorized user 113. In one or more embodiments, the image can be compared to one or more predefined reference images stored in a memory of the electronic device 114 at step 402. By making such a comparison, one or more processors disposed within the electronic device 114 can confirm whether the shape, skin tone, eye color, hair color, hair length, and other features identifiable in a two-dimensional image are that of the authorized user 113 identified by the one or more predefined reference images.

In one or more embodiments, authentication system of the electronic device 114 can further include a depth scanner. In one or more embodiments the depth scanner captures at least one depth scan of the authorized user 113 when situated within the predefined radius of the electronic device 114. In one embodiment, the depth imager captures a single depth scan of the object. In another embodiment, the depth imager captures a plurality of depth scans of the object.

In one or more embodiments, the image and the depth scan are used in combination for authentication purposes. In one or more embodiments one or more processors compare the image 514 with the one or more predefined reference images at step 402. The one or more processors of the electronic device 114 compare the depth scan with the one or more predefined facial maps at step 402. Authentication, determined by decision 403, will fail in one or more embodiments unless the image sufficiently corresponds to at least one of the one or more predefined images and the depth scan sufficiently corresponds to at least one of the one or more predefined facial maps.

In one or more embodiments, authentication is successful, as determined by decision 403, where the at least one image sufficiently corresponds to at least one of the one or more predefined images and the at least one depth scan sufficiently corresponds to at least one of the one or more predefined facial maps. Where both are true, decision 403 determines that the person of step 401 is authenticated as the authorized user 113.

In one or more embodiments, when the authentication fails, as determined by decision 403, the one or more processors of the electronic device 114 can lock or limit full access the electronic device 114 to preclude access to it or the information stored therein at step 410. When the electronic device 114 is locked, the one or more processors may then require additional authorized user identification factors beyond the image or the depth scan to authenticate a person as being authorized to use the electronic device 114 at the next authentication cycle.

At step 404, a location detector of the electronic device 114 determines a location of the electronic device 114. In one or more embodiments, this determination of the location by the location detector occurs when the authentication of the authorized user 113 occurs. Thus, the location identified by the location detector is the location of authentication in such an embodiment. In one or more embodiments, step 404 also comprises one or more processors of the electronic device 114 causing a geofence manager of the electronic device 114 to establish a geofence 118 about the location in response to authentication of the authorized user 113, as shown at step 405.

As with the method (100) of FIG. 1, in the method 400 of FIG. 4, one or more processors of the electronic device 114 operate the electronic device 114 in a first mode of operation while the electronic device 114 remains within the geofence 118, but operate the electronic device 114 in a different mode of operation when the electronic device 114 moves outside the geofence 118. In the illustrative embodiment of FIG. 4, the one or more processors of the electronic device 114 operate the electronic device 114 in a normal mode of operation at step 408 while the electronic device 114 remains within the geofence 118, as determined at decision 407.

However, the one or more processors of the electronic device 114 require reauthentication of the authorized user 113 at step 409 when the electronic device 114 exits the geofence 118, as determined at decision 407. Upon failing to authenticate the authorized user 113 at step 409, in one or more embodiments step 410 further comprises locking the electronic device 114, or alternatively causing the electronic device 114 to enter an enhanced security mode of operation.

In one or more embodiments, optional step 406 comprises detecting, with one or more motion sensors of the electronic device 114, motion of the electronic device 114 while the electronic device 114 is within the geofence 118 and is operating in the normal mode of operation. In one or more embodiments, step 406 can then cause the geofence 118 to move in accordance with the detected motion of the electronic device 114. Advantageously, this allows the authorized user 113 to walk, bicycle, skateboard, drive, ride a train, etc., all the while remaining within the geofence 118.

Figure 3:
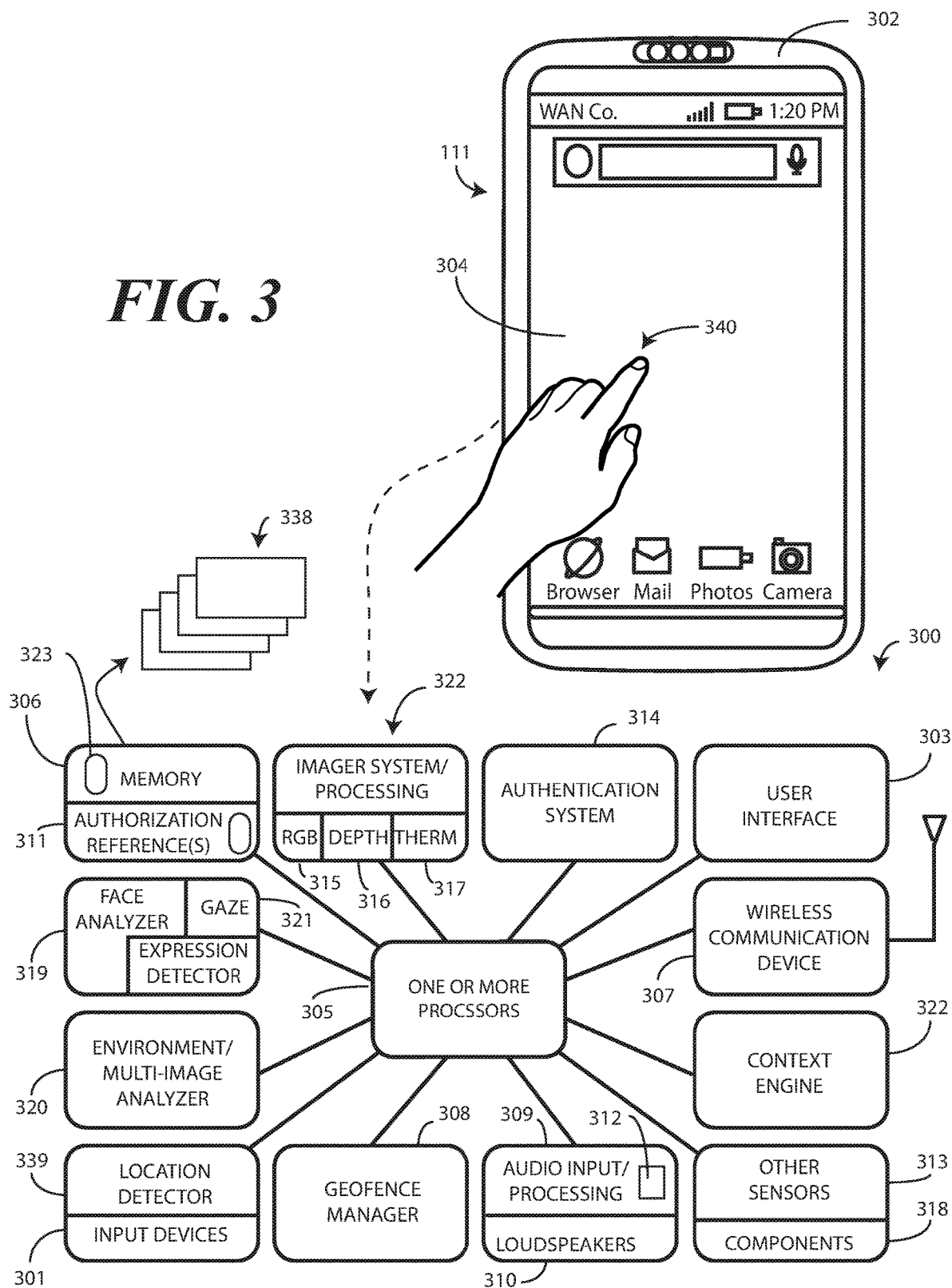
FIG. 3 illustrates one explanatory electronic device in accordance with one or more embodiments of the disclosure.

Turning now to FIG. 3, illustrated therein is one explanatory electronic device 114 configured in accordance with one or more embodiments of the disclosure in more detail. The electronic device 114 can be used with the method (100) of FIG. 1, the method (400) of FIG. 4, or with other methods described herein.

Figure 10:
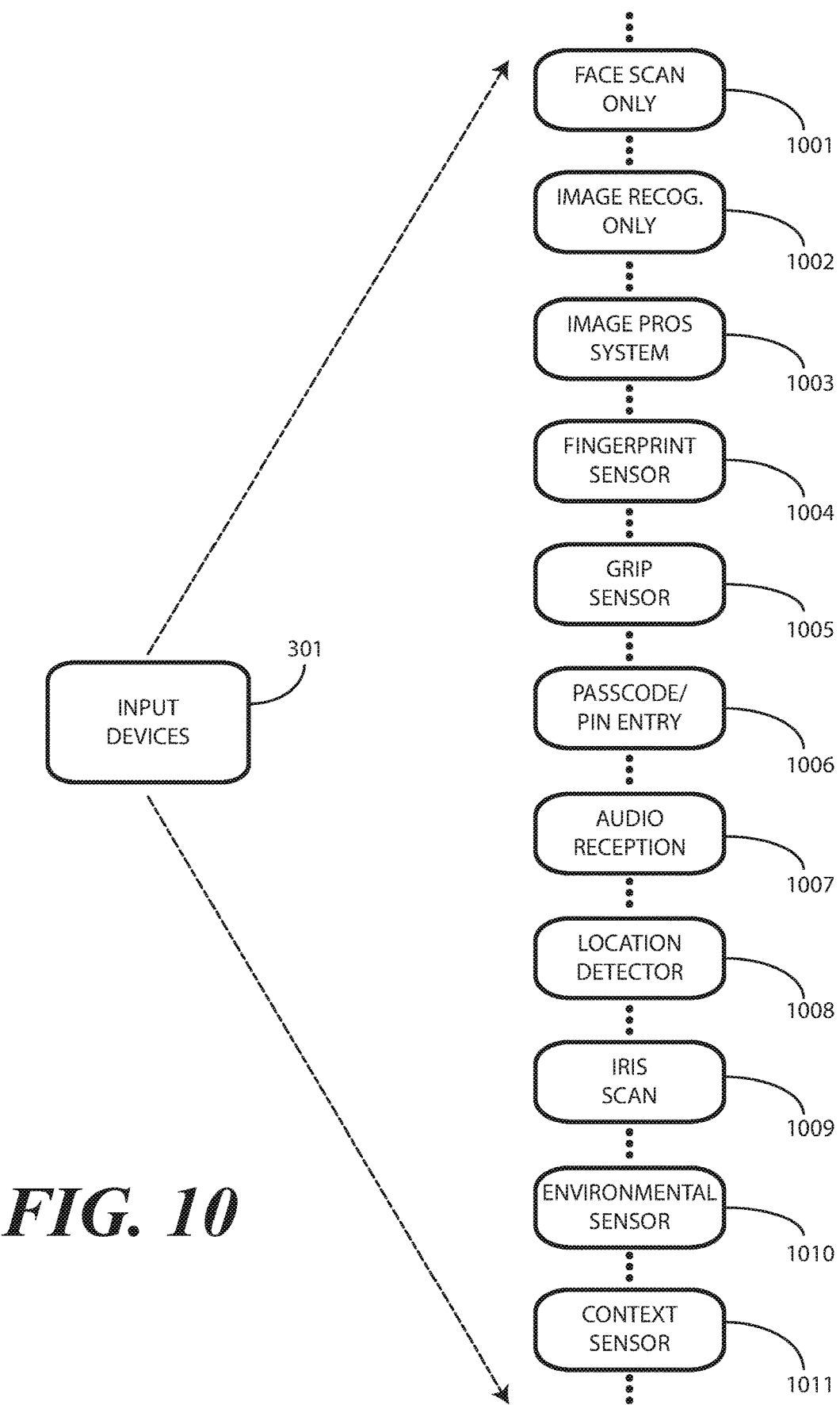
FIG. 10 illustrates one or more explanatory input devices for use, in various combinations, in an electronic device configured in accordance with one or more embodiments of the disclosure.

In this illustrative embodiment, the electronic device 114 includes several different input devices 301. Turning briefly to FIG. 10, illustrated therein are various examples of input devices 301 that can be included with the electronic device (114) in accordance with one or more embodiments of the disclosure. The input devices 301 can be used in alone or in combination. Moreover, the input devices 301 shown in FIG. 10 are illustrative only, and are not intended to provide a comprehensive list of the input devices 301 suitable for use with an electronic device (114). Numerous other input devices 301 will be obvious to those of ordinary skill in the art having the benefit of this disclosure.

A first input device 1001 can comprise a facial scanner. The first input device 1001 can capture at least one depth scan an object when situated within the predefined radius of an electronic device (114). The facial scanner can take any of a number of forms. These include the use of stereo imagers, separated by a predefined distance, to create a perception of depth, the use of structured light lasers to scan patterns—visible or not—that expand with distance and that can be captured and measured to determine depth or projecting different patterns, time of flight sensors that determine how long it takes for an infrared or laser pulse to translate from an electronic device to a user and back. Other types of facial scanners will be obvious to those of ordinary skill in the art having the benefit of this disclosure. However, in each case, the facial scanner creates a depth map of a three-dimensional object, such as a person's face. This depth map can then be compared to one or more predefined authentication reference files to confirm whether the contours, nooks, crannies, curvatures, and features of the person's face are that of an authorized user identified by the one or more predefined authentication references, which may include one or more predefined facial maps.

A second input device 1002 comprises an imager. The imager can capture at least one image of an object situated within a predefined radius of an electronic device (114). In one embodiment, the imager captures a single image of the object. In another embodiment, the imager captures a plurality of images of the object. In one or more embodiments, the one or more images are each a two-dimensional image. For example, in one embodiment the image is a two-dimensional RGB image. In another embodiment, the image is a two-dimensional infrared image. Other types of two-dimensional images will be obvious to those of ordinary skill in the art having the benefit of this disclosure.

A third input device 1003 can comprise a combined image processing system. The combined image processing system can use images and depth scans in combination. The third input device 1003 can also include a thermal sensor to detect an amount of thermal energy received from an object within a thermal reception radius of an electronic device (114). In one or more embodiments, the input device 1003 can be directional so as to ensure that any received thermal energy is spatially aligned with a particular object.

A fourth input device 1004 can be a fingerprint sensor. The fingerprint sensor can capture a fingerprint image when a finger is placed near or against the fingerprint sensor. As used herein, a fingerprint image refers to a digital image and/or any other type of data representing the print pattern features that distinctly identify a fingerprint of a finger. The fourth input device 1004 can also include a presence sensor that periodically detects a presence of a warm object near the fingerprint sensor. In implementations, a fingerprint sensor can also be implemented to detect user presence, rather than implementing a separate presence sensor.

A fifth input device 1005 can comprise a grip sensor. Examples of grip sensors include inductive touch sensors, capacitive touch sensors, pressure sensors, and force sensors. Other examples of grip sensors will be obvious to those of ordinary skill in the art having the benefit of this disclosure A sixth input device 1006 can comprise a PIN code receiver. The PIN code receiver can receive a PIN code or a pass code from a user.

A seventh input device 1007 can comprise an audio input device, such as one or more microphones. The seventh input device 1007 can comprise voice recognition engine where the identification of voices within the audio input received by the one or more microphones is desired. The voice recognition engine can comprise executable code, hardware, and various voice print templates (also referred to as "voice models"). The voice recognition engine can use the voice print templates to compare a voiceprint from received input. In operation, the voice recognition engine obtains voice data using at least one microphone. The voice recognition engine can extract voice recognition features from the voice data and generate a voiceprint. The voice recognition engine can compare the voiceprint to at least one predefined authentication reference, which may comprise a predefined voice print template.

An eighth input device 1008 can comprise a location detector. The location detector can comprise a geo-locator. The location detector is able to determine location data of an electronic device (114) by capturing the location data from a constellation of one or more earth orbiting satellites, or from a network of terrestrial base stations to determine an approximate location.

A ninth input device 1009 can comprise an iris scanner. The iris scanner can capture images and/or thermal or infrared scans of a person's iris. The iris scanner can employ either or both of visible and near-infrared light. The iris scanner can capture high-contrast images of a person's iris.

A tenth input device 1010 can comprise an environmental sensor. The environmental sensor can sense or determine physical parameters indicative of conditions in an environment about an electronic device (114). Such conditions include weather determinations, noise determinations, lighting determinations, and so forth. Such conditions can also include barometric pressure, moisture levels, and temperature of an electronic device (114).

An eleventh input device 1011 can comprise a context sensor. In contrast to the environmental sensor of the tenth input device 1010, the context sensor of the eleventh input device 1011 can infer context from data of the electronic device (114). Illustrating by example, the context sensor can use data captured in images to infer contextual cues. An emotional detector may be operable to analyze data from a captured image to determine an emotional state of persons within an environment of the electronic device (114). The emotional detector may identify facial gestures such as a smile or raised eyebrow to infer a person's silently communicated emotional state, e.g. joy, anger, frustration, and so forth. The context sensor may analyze other data to infer context, including calendar events, user profiles, device operating states, energy storage within a battery, application data, data from third parties such as web services and social media servers, alarms, time of day, behaviors a user repeats, and other factors. Other context sensors will be obvious to those of ordinary skill in the art having the benefit of this disclosure. The context sensor can be configured as either hardware components, or alternatively as combinations of hardware components and software components. The context sensor can be configured to collect and analyze non-physical parametric data.

Turning now back to FIG. 3, illustrated therein is one explanatory block diagram schematic 300 of one explanatory electronic device 114 configured in accordance with one or more embodiments of the disclosure. While a smartphone has been used to this point as an illustrative electronic device 114, it should be noted that the electronic device 114 could be other types of devices as well. In other embodiments, the electronic device 114 can be a palm-top computer, tablet computer, gaming device, media player, wearable device, or other device. Still other devices will be obvious to those of ordinary skill in the art having the benefit of this disclosure.

In one or more embodiments, the block diagram schematic 300 is configured as a printed circuit board assembly disposed within a housing 302 of the electronic device 114. Various components can be electrically coupled together by conductors or a bus disposed along one or more printed circuit boards.

The illustrative block diagram schematic 300 of FIG. 3 includes many different components. Embodiments of the disclosure contemplate that the number and arrangement of such components can change depending on the particular application. Accordingly, electronic devices configured in accordance with embodiments of the disclosure can include some components that are not shown in FIG. 3, and other components that are shown may not be needed and can therefore be omitted.

The illustrative block diagram schematic 300 includes a user interface 303. In one or more embodiments, the user interface 303 includes a display 304, which may optionally be touch-sensitive. In one embodiment, users can deliver user input to the display 304 of such an embodiment by delivering touch input from a finger, stylus, or other objects disposed proximately with the display 304. In one embodiment, the display 304 is configured as an active matrix organic light emitting diode (AMOLED) display. However, it should be noted that other types of displays, including liquid crystal displays, suitable for use with the user interface 303 would be obvious to those of ordinary skill in the art having the benefit of this disclosure.

In one embodiment, the electronic device includes one or more processors 305. In one embodiment, the one or more 3 can include an application processor and, optionally, one or more auxiliary processors. One or both of the application processor or the auxiliary processor(s) can include one or more processors. One or both of the application processor or the auxiliary processor(s) can be a microprocessor, a group of processing components, one or more ASICs, programmable logic, or other type of processing device. The application processor and the auxiliary processor(s) can be operable with the various components of the block diagram schematic 300. Each of the application processor and the auxiliary processor(s) can be configured to process and execute executable software code to perform the various functions of the electronic device with which the block diagram schematic 300 operates. A storage device, such as memory 306, can optionally store the executable software code used by the one or more processors 305 during operation.

In this illustrative embodiment, the block diagram schematic 300 also includes a communication circuit 307 that can be configured for wired or wireless communication with one or more other devices or networks. The networks can include a wide area network, a local area network, and/or personal area network. The communication circuit 307 may also utilize wireless technology for communication, such as, but are not limited to, peer-to-peer or ad hoc communications such as HomeRF, Bluetooth and IEEE 802.11; and other forms of wireless communication such as infrared technology. The communication circuit 307 can include wireless communication circuitry, one of a receiver, a transmitter, or transceiver, and one or more antennas.

In one embodiment, the one or more processors 305 can be responsible for performing the primary functions of the electronic device with which the block diagram schematic 300 is operational. For example, in one embodiment the one or more processors 305 comprise one or more circuits operable with the user interface 303 to present presentation information, such as prompts, images, or animations, to a user on the display 304. Alternatively, the one or more processors 305 comprise one or more circuits operable with the user interface 303 to deliver audio output through one or more loudspeakers 310. The executable software code used by the one or more processors 305 can be configured as one or more modules 338 that are operable with the one or more processors 305. Such modules 338 can store instructions, control algorithms, and so forth.

In one or more embodiments, the block diagram schematic 300 includes an audio input/processor 309 and optionally one or more loudspeakers 310. The audio input/processor 309 can include hardware, executable code, and speech monitor executable code in one embodiment. The audio input/processor 309 can be operable with one or more predefined authentication references 311 stored in memory 306. With reference to audio input, the predefined authentication references 311 can comprise representations of basic speech models, representations of trained speech models, or other representations of predefined audio sequences that are used by the audio input/processor 309 to receive and identify voice commands that are received with audio input captured by an audio capture device. In one embodiment, the audio input/processor 309 can include a voice recognition engine. Regardless of the specific implementation utilized in the various embodiments, the audio input/processor 309 can access various speech models stored with the predefined authentication references 311 to identify speech commands.

The audio input/processor 309 can include a beam steering engine comprising one or more microphones 312. In one or more embodiments, two or more microphones 312 can be included for selective beam steering by the beam steering engine. For example a first microphone can be located on a first side of the electronic device 114 for receiving audio input from a first direction. Similarly, a second microphone can be placed on a second side of the electronic device 114 for receiving audio input from a second direction.

The beam steering engine can then select between the first microphone and the second microphone to beam steer audio reception toward an object, such as a user delivering audio input. This beam steering can be responsive to input from other sensors, such as imagers, facial depth scanners, thermal sensors, or other sensors. For example, an imager can estimate a location of a person's face and deliver signals to the beam steering engine alerting it in which direction to steer the first microphone and the second microphone. Where multiple people are around the electronic device 114, this steering advantageously directs a beam reception cone to the authorized user, rather than to others who are not authorized to use the electronic device 114.

Figure 9:
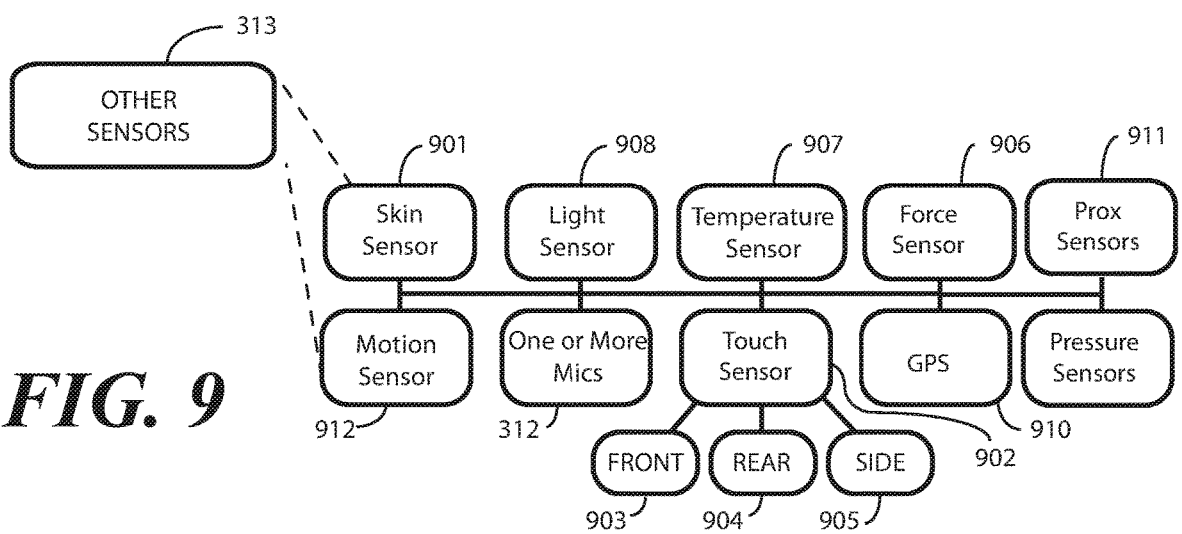
FIG. 9 illustrates one or more explanatory sensors suitable for use, in various combinations, in an electronic device configured in accordance with one or more embodiments of the disclosure.

Various input devices 301 can be operable with the one or more processors 305. FIG. 10 illustrates several examples such input devices 301. In addition, one or more other sensors 313 can be operable with the one or more processors 305. Turning briefly to FIG. 9, illustrated therein are some of the other sensors 313 that can be included with the electronic device (114). General examples of these sensors include time sensors, date sensors, environmental sensors, weather sensors, ultrasonic sensors, location sensors, and so forth.

In one embodiment, a skin sensor 901 is configured to determine when the electronic device is touching the skin of a person. The skin sensor 901 can be used, for example, to detect the cessation of physical contact between an authorized user and an electronic device. For example, the skin sensor 901 can detect when the electronic device is being held within, or is released from, the hand of a user. The skin sensor 901 can include a substrate with an electrode disposed thereon. The electrode can confirm the object touching the skin sensor 901 is skin by detecting electrical signals generated by a heartbeat in one embodiment. Other forms of skin sensors will be obvious to those of ordinary skill in the art having the benefit of this disclosure.

A touch sensor 902 can be operable with, or in place of, the skin sensor 901. The touch sensor 902 can be used, for example, to detect the cessation of physical contact between an authorized user and an electronic device. The touch sensor 902 can include a capacitive touch sensor, an infrared touch sensor, resistive touch sensors, or another touch-sensitive technology.

In one or more embodiments, the touch sensor 902 comprises a plurality of touch sensors. For example, a first touch sensor 903 can be disposed on the front major face of the electronic device (114). A second touch sensor 904 can be disposed on the rear major face of the electronic device (114). A third touch sensor 905 can be situated along one or more of the minor faces defined by the sides of the electronic device (114).

A force sensor 906 can be included. The force sensor 906 can be used, for example, to detect the cessation of physical contact between an authorized user and an electronic device. The force sensor 906 can take various forms. For example, in one embodiment, the force sensor 906 comprises resistive switches or a force switch array where changes in impedance of any of the switches—due to force applied—may be detected. The array of switches may be any of resistance sensing switches, membrane switches, force-sensing switches such as piezoelectric switches, or other equivalent types of technology. In another embodiment, the force sensor 906 can be capacitive. In yet another embodiment, piezoelectric sensors can be configured to sense force as well.

A temperature sensor 907 or other thermal imager can be configured to monitor the temperature of the environment about the electronic device (114). A light sensor 908 can be used to detect whether or not ambient light is incident on the housing of the electronic device (114). The light sensor 908 can also be used to detect an intensity of ambient light is above or below a predefined threshold. In one or more embodiments the light sensor 908 can detect changes in optical intensity, color, light, or shadow in the near vicinity of the electronic device (114). In one embodiment, the light sensor 908 can be configured as an image-sensing device that captures successive images about the device and compares luminous intensity, color, or other spatial variations between images to detect weather conditions. One or more microphones 312 can be included to receive acoustic input as previously described.

In one or more embodiments a global positioning system device 910 can be included as a location detector for determining a location and/or movement of the electronic device (114). In one or more embodiments, the global positioning system device 910 is configured for communicating with a constellation of earth orbiting satellites or a network of terrestrial base stations to determine an approximate location. The satellite positioning systems based location fixes of the global positioning system device 910 autonomously or with assistance from terrestrial base stations, for example those associated with a cellular communication network or other ground based network, or as part of a Differential Global Positioning System (DGPS), as is well known by those having ordinary skill in the art.

While a global positioning system device 910 is one example of a location detector, it will be clear to those of ordinary skill in the art having the benefit of this disclosure that other location detectors, such as electronic compasses or gyroscopes, could be used as well. For example, the global positioning system device 910 can be replaced by, or accompanied by, a location detector able to determine location by locating or triangulating terrestrial base stations of a traditional cellular network, or from other local area networks, such as Wi-Fi networks.

In still other embodiments, the location detector could be configured in other ways. Illustrating by example, in another embodiment, the location detector of the electronic device (114) could be configured as wireless communication circuitry that uses wireless signals from local Wi-Fi, Bluetooth.sup.™, radio frequency identification (RFID) devices, or light detection and ranging (LiDAR) as beacons to determine a location or position of the electronic device (114) when indoors.

In still other embodiments, the location detector of the electronic device (114) could triangulate local wireless signals using received signal strength indicator (RSSI) techniques or time-of-flight methods. Regardless of the type of location detector used, the motion sensors 912 or other sensors could then be used to augment the operation of the location detector. For example, the motion sensors 912 could be used in a "dead reckoning" process where the one or more processors (305) of the electronic device (114) determine that the electronic device (114) has been carried a certain number of steps away from the center of the geofence, and so forth. Gyroscopes, accelerometers, magnetometers, and even barometers can be used in a similar fashion.

In other instances, the electronic device (114) may employ "six degrees of freedom" (6DOF) sensing where the one or more processors (305) of the electronic device (114) can track motion of the electronic device (114) in three-dimensional space using depth sensing or radar technologies to track nearby objects. By determining location as the electronic device (114) moves past certain objects, the one or more processors (305) can determine whether the electronic device (114) has traveled away from a particular location. Other techniques for determining whether the electronic device (114) has moved in three-dimensional space and/or whether the electronic device (114) remains within a geofence will be obvious to those of ordinary skill in the art having the benefit of this disclosure.

The other sensors 313 can include proximity sensors 911. The proximity sensors 911 can be used, for example, to detect the cessation of physical contact between an authorized user and an electronic device. In one or more embodiments, the proximity sensors 911 fall in to one of two camps: active proximity sensors and "passive" proximity sensors. As used herein, a "proximity sensor component" comprises a signal receiver only that does not include a corresponding transmitter to emit signals for reflection off an object to the signal receiver. A signal receiver only can be used due to the fact that a user's body or other heat generating object external to device, such as a wearable electronic device worn by user, serves as the transmitter. Proximity sensor components are sometimes referred to as a "passive IR detectors" due to the fact that the person is the active transmitter. Accordingly, the proximity sensor component requires no transmitter since objects disposed external to the housing deliver emissions that are received by the infrared receiver.

As no transmitter is required, each proximity sensor component can operate at a very low power level.

By contrast, proximity detector components include a signal emitter and a corresponding signal receiver, which constitute an "active IR" pair. While each proximity detector component can be any one of various types of proximity sensors, such as but not limited to, capacitive, magnetic, inductive, optical/photoelectric, imager, laser, acoustic/sonic, radar-based, Doppler-based, thermal, and radiation-based proximity sensors, in one or more embodiments the proximity detector components comprise infrared transmitters and receivers.

The other sensors 313 can also include a motion detector 912. The motion detector 912 can include motion detectors, such as one or more accelerometers or gyroscopes. For example, an accelerometer may be embedded in the electronic circuitry of the electronic device (114) to show vertical orientation, constant tilt and/or whether the electronic device (114) is stationary.

Regardless of the type of motion detectors 912 that are used, in one embodiment the motion detectors 912 are also operable to detect movement, and direction of movement, of the electronic device (114) by a user. In one or more embodiments, the other sensors 313 and the motion detectors 912 can each be used to detect motion of the electronic device (114) beyond a geofence (118) established by a geofence manager, and so forth. The motion detectors 912 can be configured as an orientation detector that determines an orientation and/or movement of the electronic device (114) in three-dimensional space. The orientation detector can determine the spatial orientation of an electronic device (114) in three-dimensional space by, for example, detecting a gravitational direction. In addition to, or instead of, an accelerometer, an electronic compass can be included to detect the spatial orientation of the electronic device (114) relative to the earth's magnetic field. Similarly, one or more gyroscopes can be included to detect rotational orientation of the electronic device (114).

By comparing the parametric data extracted from this motion to a reference file stored in memory (306), a context engine can identify the fact that the movement that the electronic device (114) is experiencing is due to the fact that the electronic device (114) is proximately located with a user's torso, limbs, head, or appendages, or otherwise generally disposed along the user body instead of, for example, being placed on a table.

Turning now back to FIG. 3, in one or more embodiments an authentication system 314 is operable with the one or more processors 305 to authenticate a person as an authorized user of the electronic device 114. The authentication system 314 can be operable with any of the input devices 301 of FIG. 10 and/or the other sensors 313 of FIG. 9, either alone or in combination.

For example, the authentication system 314 can be operable with an imager 315, a depth scanner 316, and a thermal sensor 317. In one embodiment, the imager 315 comprises a two-dimensional imager configured to receive at least one image of a person within an environment of the electronic device 114. In one embodiment, the imager 315 comprises a two-dimensional Red-Green-Blue (RGB) imager. In another embodiment, the imager 315 comprises an infrared imager. Other types of imagers suitable for use as the imager 315 of the authentication system 314 will be obvious to those of ordinary skill in the art having the benefit of this disclosure.

The thermal sensor 317 can also take various forms. In one embodiment, the thermal sensor 317 is simply a proximity sensor component included with the other components 318. In another embodiment, the thermal sensor 317 comprises a simple thermopile. In another embodiment, the thermal sensor 317 comprises an infrared imager that captures the amount of thermal energy emitted by an object. Other types of thermal sensors will be obvious to those of ordinary skill in the art having the benefit of this disclosure.

The depth scanner 316 can take a variety of forms. In a first embodiment, the depth scanner 316 comprises a pair of imagers separated by a predetermined distance, such as three to four images. This "stereo" imager works in the same way the human eyes do in that it captures images from two different angles and reconciles the two to determine distance.

In another embodiment, the depth scanner 316 employs a structured light laser. The structured light laser projects tiny light patterns that expand with distance. These patterns land on a surface, such as a user's face, and are then captured by an imager. By determining the location and spacing between the elements of the pattern, three-dimensional mapping can be obtained.

In still another embodiment, the depth scanner 316 comprises a time of flight device. Time of flight three-dimensional sensors emit laser or infrared pulses from a photodiode array. These pulses reflect back from a surface, such as the user's face. The time it takes for pulses to move from the photodiode array to the surface and back determines distance, from which a three-dimensional mapping of a surface can be obtained. Regardless of embodiment, the depth scanner 316 adds a third "z-dimension" to the x-dimension and y-dimension defining the two-dimensional image captured by the imager 315, thereby enhancing the security of using a person's face as their password in the process of authentication by facial recognition.

The authentication system 314 can be operable with a face analyzer 319 and an environmental analyzer 320. The face analyzer 319 and/or environmental analyzer 320 can be configured to process an image or depth scan of an object and determine whether the object matches predetermined criteria by comparing the image or depth scan to one or more predefined authentication references 311 stored in memory 306.

For example, the face analyzer 319 and/or environmental analyzer 320 can operate as an authentication module configured with optical and/or spatial recognition to identify objects using image recognition, character recognition, visual recognition, facial recognition, color recognition, shape recognition, and the like. Advantageously, the face analyzer 319 and/or environmental analyzer 320, operating in tandem with the authentication system 314, can be used as a facial recognition device to determine the identity of one or more persons detected about the electronic device 114.

In one embodiment when the authentication system 314 detects a person, one or both of the imager 315 and/or the depth scanner 316 can capture a photograph and/or depth scan of that person. The authentication system 314 can then compare the image and/or depth scan to one or more predefined authentication references 311 stored in the memory 306. This comparison, in one or more embodiments, is used to confirm beyond a threshold authenticity probability that the person's face—both in the image and the depth scan—sufficiently matches one or more of the predefined authentication references 311 stored in the memory 306 to authenticate a person as an authorized user of the electronic device 114. Beneficially, this optical recognition performed by the authentication system 314 operating in conjunction with the face analyzer 319 and/or environmental analyzer 320 allows access to the electronic device 114 only when one of the persons detected about the electronic device are sufficiently identified as an authorized user of the electronic device 114.

In one or more embodiments, a user can "train" the authentication system 314 by storing predefined authentication references 311 in the memory 306 of the electronic device 114 or can train the authentication system 314 to look for specific characters, landmarks, locations, and so forth to alter what the electronic device 114 does in such situation using a known history. Illustrating by example, a user may take a series of pictures. They can include identifiers of special features such as eye color, skin color, hair color, weight, and height. They can include the user standing in front of a particular wall, which is identifiable by the environmental analyzer from images captured by the imager 315. They can include the user raising a hand, touching hair, or looking in one direction, such as in a profile view. These can then be stored as predefined authentication references 311 in the memory 306 of the electronic device 114.

A gaze detector 321 can be operable with the authentication system 314 operating in conjunction with the face analyzer 319. The gaze detector 321 can comprise sensors for detecting the user's gaze point. The gaze detector 321 can optionally include sensors for detecting the alignment of a user's head in three-dimensional space. Electronic signals can then be processed for computing the direction of user's gaze in three-dimensional space. The gaze detector 321 can further be configured to detect a gaze cone corresponding to the detected gaze direction, which is a field of view within which the user may easily see without diverting their eyes or head from the detected gaze direction. The gaze detector 321 can be configured to alternately estimate gaze direction by inputting images representing a photograph of a selected area near or around the eyes. It will be clear to those of ordinary skill in the art having the benefit of this disclosure that these techniques are explanatory only, as other modes of detecting gaze direction can be substituted in the gaze detector 321 of FIG. 3.

The face analyzer 319 can include its own image/gaze detection-processing engine as well. The image/gaze detection-processing engine can process information to detect a user's gaze point. The image/gaze detection-processing engine can optionally also work with the depth scans to detect an alignment of a user's head in three-dimensional space. Electronic signals can then be delivered from the imager 315 or the depth scanner 616 for computing the direction of user's gaze in three-dimensional space.

Other components 318 operable with the one or more processors 305 can include output components such as video, audio, and/or mechanical outputs. For example, the output components may include a video output component or auxiliary devices including a cathode ray tube, liquid crystal display, plasma display, incandescent light, fluorescent light, front or rear projection display, and light emitting diode indicator. Other examples of output components include audio output components such as a loudspeaker disposed behind a speaker port or other alarms and/or buzzers and/or a mechanical output component such as vibrating or motion-based mechanisms. The other components 318 can optionally include a barometer operable to sense changes in air pressure due to elevation changes or differing pressures of the electronic device 114.

A context engine 322 can then operable with the various sensors and input devices to detect, infer, capture, and otherwise determine persons and actions that are occurring in an environment about the electronic device 114. For example, where included one embodiment of the context engine 322 determines assessed contexts and frameworks using adjustable algorithms of context assessment employing information, data, and events. These assessments may be learned through repetitive data analysis. Alternatively, a user may employ the user interface 303 to enter various parameters, constructs, rules, and/or paradigms that instruct or otherwise guide the context engine 322 in detecting multi-modal social cues, emotional states, moods, and other contextual information. The context engine 322 can comprise an artificial neural network or other similar technology in one or more embodiments.

In one or more embodiments, the context engine 322 is operable with the one or more processors 305. In some embodiments, the one or more processors 305 can control the context engine 322. In other embodiments, the context engine 322 can operate independently, delivering information gleaned from detecting multi-modal social cues, emotional states, moods, and other contextual information to the one or more processors 305. The context engine 322 can receive data from the various input devices 301 and/or the other sensors 313. In one or more embodiments, the one or more processors 305 are configured to perform the operations of the context engine 322.

In one or more embodiments, a geofence manager 308 is operable with the one or more processors 305. The geofence manager 308 can be operable with one or more processors 305, configured as a component of the one or more processors 305, or configured as one or more modules 338 operating on the one or more processors 305. In one or more embodiments, the geofence manager 308 establishes a geofence about the location determined by the location detector 339, or alternatively about the electronic device 114 itself. As described above, the geofence defines a boundary about the location or electronic device 114 fixed by one or more geographic coordinates. For example, the geofence may be defined by a radius of, say, thirty feet around the location determined by the location detector 339 when the electronic device 114 is placed upon a surface in one embodiment.

In one or more embodiments, the one or more processors 305 of the electronic device 114 operate the electronic device 114 in a normal mode of operation, with all functions and data being accessible, so long as the electronic device 114 remains within the geofence established by the geofence manager 308. However, when the electronic device 114 exits the geofence, in one or more embodiments the one or more processors 305 cause the electronic device 114 to enter an enhanced security mode of operation. When operating in the enhanced security mode of operation, various control operations can be performed to limit access to functions and/or data. In other embodiments, the enhanced security mode of operation can lock the electronic device 114 all together.

As noted above with reference to FIG. 1, the electronic device 114 can operate in various configurations. In a primary embodiment, the geofence manager 308 establishes a geofence about a location where the electronic device 114 is placed upon a surface. However, in other embodiments, such as when the electronic device 114 is configured with touch or grip sensors, the geofence manager 308 establishes a geofence when an authorized user gives the electronic device 114 to another person. In still another embodiment, the geofence manager 308 establishes a geofence when the electronic device 114 is forcibly taken from the authorized user, such as when being stolen by a malfeasant actor. As will be described below with reference to FIG. 4, in still other embodiments, the geofence manager 308 establishes a geofence when a user is authenticated as an authorized user of the electronic device 114.

As such, the geofence manager 308 can establish the geofence in response to a variety of conditions occurring. In one or more embodiments, the one or more processors 305 of the electronic device 114 cause the geofence manager 308 to establish a geofence when one or both of the input devices 301 and/or other sensors 313 detect a cessation of physical contact between an authorized user of the electronic device 114 and the housing 302 or display 304 or other surface of the electronic device 114. This mechanism of establishing the geofence covers the situation where the authorized user places the electronic device 114 on a surface, the authorized user gives the electronic device 114 to another person, and/or when the electronic device 114 is forcibly taken from authorized user. Alternatively, as will be shown with reference to FIG. 6 below, the one or more processors 305 cause the geofence manager 308 to establish the geofence when one or both of the input devices 301 and/or other sensors 313 authenticate a person as an authorized user of the electronic device 114.

Just as the one or more processors 305 can cause the geofence manager 308 to establish the geofence in response to a variety of situations, so too can the one or more processors 305 can then cause the electronic device 114 to transition from the normal mode of operation to the enhanced security mode of operation in response to various conditions. As described above with reference to FIG. 1, the one or more processors 305 can cause the electronic device 114 to transition from the normal mode of operation to the enhanced security mode of operation when one or both of the input devices 301 and/or the other sensors 313 detect the electronic device 114 exiting the geofence.

In another embodiment, however, the one or more processors 305 can cause the electronic device 114 to transition from the normal mode of operation the enhanced security mode of operation when the electronic device 114 simply enters a locked mode of operation. For example, if an authorized user is using the electronic device 114, and leaves the electronic device 114 idle for a predefined duration causing the electronic device 114 to enter the locked mode, in one or more embodiments the one or more processors 305 can cause the electronic device 114 to enter the enhanced security mode of operation as well. The user can train the electronic device 114 or set the electronic device 114 in the menu to allow other family recognized members to move and operate the electronic device 114 under different sub-classes of lock up modes (less restrictive modes than those for a strangers and different means to authorize).

Additionally, the one or more processors 305 can cause the electronic device 114 to transition from the normal mode of operation to the enhanced security mode of operation at the same time as the geofence manager 308 establishes the geofence in one or more embodiments, such as when the authorized user places the electronic device 114 upon a surface. Accordingly, in one or more embodiments the one or more processors 305 can transition the electronic device 114 from the normal mode of operation to the enhanced security mode of operation upon one or both of the input devices 301 and/or the other sensors 313 detecting the cessation of the physical contact between the authorized user and the electronic device 114. This mechanism not only establishes the geofence, but also transitions the electronic device 114 from the normal mode of operation to the enhanced security mode of operation in situations such as where the authorized user places the electronic device 114 on a surface, the authorized user gives the electronic device 114 to another person, and/or when the electronic device 114 is forcibly taken from authorized user. In one or more embodiments, the one or more processors 305 disable the user interface 303 when the electronic device 114 is operating in the enhanced security mode of operation.

As described with reference to FIG. 9 above, in one or more embodiments the other sensors 313 include one or more motion detectors (912). In one or more embodiments, the one or more processors 305 can cause the geofence manager 308 to move the geofence with the electronic device 114 from the location at which the geofence manager 308 initially establishes the geofence when the one or more motion detectors (912) detect motion of the electronic device 114 from the location while in the normal mode of operation. For example, as will be described with reference to FIG. 4 below, in one or more embodiments the one or more processors 305 cause the geofence manager 308 to establish the geofence when one or both of the input devices 301 and/or other sensors 313 authenticate the authorized user of the electronic device 114. Embodiments of the disclosure contemplate that this enablement of the geofence can be useful, for example, when the authorized user is in a vehicle for example. Embodiments of the disclosure contemplate that the authorized user may desire to have a geofence around the vehicle, which moves with the vehicle, to prevent the electronic device 114 from being stolen from the vehicle. At the same time, embodiments of the disclosure contemplate that the authorized user may not want to hold the electronic device 114 in their hand while driving.

To accommodate this situation, in one or more embodiments the one or more processors 305 cause the geofence manager 308 to establish the geofence upon the authorized user being authenticated by the authentication system 314. However, in this situation when the one or more motion detectors (912) detect motion of the electronic device 114 from the location in which the geofence was established, but while the electronic device 114 is operating in the normal mode of operation, the one or more processors 305 cause the geofence manager 308 to move the geofence with the electronic device 114. In one or more embodiments, the authorized user is only required to reauthenticate when they exit the vehicle, which the one or more motion detectors (912) can detect, for example, by detecting the authorized user walking with the electronic device 114.

In one or more embodiments, the geofence established by the geofence manager 308 has a predefined radius. In one or more embodiments a user can deliver user input to the user interface 303 to define the default radius of the geofence. Said differently, in one or more embodiments the user interface 303 receives user input 340 defining a default radius for the geofence established by the geofence manager 308.

As will be described in more detail below with reference to FIG. 5, this predefined radius can be increased—or decreased—based upon conditions sensed by one or both of the input devices 301 and/or the other sensors 313. Accordingly, in one or more embodiments the one or more processors 305 can cause the geofence manager 308 to one of expand the default radius or reduce the default radius as a function of one or more criteria. For example, if the location at which the geofence manager 308 establishes the geofence is one where the electronic device 114 has never been in the past, e.g., a strange location, an unfamiliar location, a newly visited area, or an odd context, the one or more processors 305 can cause the geofence manager 308 to reduce the default radius as a function of whether the location matches such criteria. By contrast, if the user is at home, the one or more processors 305 can cause the geofence manager 308 to expand the default radius as a function of the location matching this criterion.

When the one or more processors 305 cause the electronic device 114 to operate in the enhanced security mode of operation, this operation can take a variety of forms. In one or more embodiments, the one or more processors 305 can disable the one or more user interface output devices while leaving the one or more sensors 313 operational. Advantageously, if someone other than the authorized user takes the electronic device 114 beyond the perimeter boundary established by the geofence manager 308, the one or more processors 305 can use the one or more sensors 313, the imager 315, the depth scanner 316, the thermal sensor 317, the one or more microphones 312, or other components to monitor sights, sounds, and other conditions in a local environment about the electronic device 114.

In one or more embodiments, the one or more processors 305 can further use the wireless communication circuit 307 to transmit a notification that the geofence established by the geofence manager 308 has been breached across a network to a remote electronic device. Illustrating by example, if a person had stolen the electronic device 114 and taken it outside of the geofence established by the geofence manager 308, the one or more processors 305 may use the wireless communication circuit 307 to transmit a text message to another electronic device belonging to the authorized user, e.g., a tablet computer, identifying the fact that an unauthorized user has possession of the electronic device 114 and breached the geofence. The message may include other information, such as an image of the unauthorized user, a location of the electronic device 114, sounds recorded by the one or more microphones 312, or other data. This alerts the authorized user to the fact that the electronic device 114 may have been stolen, thereby facilitating easier and quicker recovery of the same.

In one or more embodiments, the one or more processors 305 attempt to capture information about the person breaching the geofence with electronic device 114 in response to the electronic device 114 initially exiting the geofence. For example, in one or more embodiments, the imager 315 may capture an image of the person and/or the depth scanner 316 may capture a depth scan of the person when the electronic device 114 exits the geofence. Embodiments of the disclosure contemplate that frequently a person will look at an electronic device while carrying it so as to avoid dropping it. Accordingly, in one or more embodiments an image or facial scan occurs as the person exits the geofence.

In one or more embodiments, the one or more processors 305 can take further steps to identify the unauthorized user when the electronic device 114 exits the geofence established by the geofence manager 308. For example, prior to disabling the one or more user interface devices, in one or more embodiments the one or more processors 305 may present a prompt, via the user interface 303, for biometric input from the person stealing the electronic device 114. Such a prompt may ask the person to authenticate or confirm their identity. For example, the one or more processors may present a prompt on the display requesting that the person place their finger on a fingerprint sensor, enter a code, look at an imager, or so forth. In one or more embodiments, the fingerprint sensor can be integrated as part of a power button.

In one or more embodiments, the one or more processors 305 can cause the electronic device 114 to emulate a powered OFF state by disabling the user interface output devices when the electronic device 114 exits the geofence established by the geofence manager 308. However, at the same time, the one or more processors 305 use the active and operational input devices to sense, hear, see, communicate, and even upload, via the wireless communication circuit 307, sensed data to a remote electronic device or the cloud. However, to the user holding the device, the electronic device appears completely OFF.

In still other embodiments, the one or more processors 305 use the input devices and other sensors to continually monitor the person using the electronic device 114. Illustrating by example, every few seconds or so the one or more processors 305 may cause the imager 315 to capture one or more images of the person, may cause the depth scanner 316 to capture one or more depth scans of the persons, may cause the one or more microphones 312 to capture voice data of the person, and so forth. Accordingly, in one or more embodiments, the one or more processors 305 can disable the one or more user interface output devices while leaving the one or more sensors operational.

Accordingly, the one or more processors 305 emulate a powered OFF state by disabling user output devices such as visual output devices, audio output devices, haptic output devices, or combinations thereof. The electronic device 114 therefore appears to be shut down. At the same time the one or more processors 305 keep one or more input devices operational. In one or more embodiments, every time a geofence is breached with an unauthorized user transporting the electronic device 114, the owner of the electronic device 114 is alerted via other device or email to conserve power, etc. In one or more embodiments, the authorized user and can override this mode of operation.

Accordingly, these input devices 301 monitor environmental conditions, including sounds, sights, location, and/or other information in one or more embodiments. The one or more processors 305 monitor this information quietly in the background while the electronic device 114 appears to be powered OFF. The fact that information is being monitored is invisible to the user possessing the electronic device 114 in this state in one or more embodiments. As the user interface output devices are OFF, all indications that anything is operational on the electronic device 114 are turned OFF.

In one or more embodiments, once the emulated powered OFF state it entered, the one or more processors 305 can increase a number of authorized user identification factors required to access preselected data stored within the electronic device 114. This preselected data can include authorized user identified files, authorized user identified data, private data, or other personal data. This preselected data can also include certain device commands such as the factory-reset command, the erase all data command, the format memory command, and so forth. This increased number of authorized user identification factors is then required to either cease emulating the powered OFF state or to again access this preselected data.

Illustrating by example, imagine that an authorized user has health and financial information stored within the memory 306 of the electronic device 114. Using the user interface 303, the authorized user may designate this data as private data to be hidden should the electronic device 114 be stolen. Upon the one or more processors 305 detecting that the electronic device 114 has exited a geofence established by the geofence manager 308, the one or more processors 305 may hide this information from view or access. If a facial scan is all that is typically required to turn the electronic device ON, the one or more processors 305 may require a facial scan, fingerprint, and personal identification number (PIN) code before revealing this information again, i.e., before transferring the electronic device 114 from the enhanced security mode of operation back to the normal mode of operation. The same number of increased user authentication factors may be required to cease emulation of a powered OFF state and return to the fully powered ON state. Alternatively, the one or more processors 305 may reveal the predefined data and/or cease the powered OFF state and return to the fully powered ON state if the authorized user delivers a facial scan while at an identified owner location, such as in front of his vehicle license plate or in his living room. Other examples of elevating the number of authorized identification factors were described above. Still others will be obvious to those of ordinary skill in the art having the benefit of this disclosure.

In still another embodiment, the one or more processors 305 may hide any device hardware command that would erase data within the electronic device 114 the electronic device 114 breaching the geofence established by the geofence manager 308. Many devices, for example, include a "factory reset" command. As used herein, a "factor reset" command is a software restore command that returns the software of the electronic device 114 to its original system state by erasing all information stored on the electronic device 114 by an authorized user in an effort to return the software to the original manufacturer's settings.

Upon detecting an unauthorized user moving the electronic device 114 beyond the perimeter boundary of the geofence established by the geofence manager 308, the one or more processors 305 may hide this command from view or access. If a facial scan is all that is typically required to turn the electronic device ON, the one or more processors 305 may require a facial scan, fingerprint, and personal identification number (PIN) code before allowing factory resets to again occur. Thus, in one or more embodiments the ability to factory reset the electronic device 114 will be disabled when the electronic device 114 is in the enhanced security mode of operation. Similarly, private applications of files identified by the user as personal can be hidden in the enhanced security mode of operation.

In one or more embodiments, the one or more processors 305 can notify other electronic devices of its location while in the enhanced security mode of operation. The one or more processors 305 can further transmit ambient environmental information such as acoustic information, weather information (wind, rain), traffic information, images of people, motion information, and so forth to these other electronic devices using the wireless communication circuit 307 when in the enhanced security mode of operation. The one or more processors 305 can, for instance, continually or periodically use the imager 315 to capture images of the immediate environment about the electronic device 114 when in the enhanced security mode of operation. The one or more processors 305 can cause these images to be transmitted from the wireless communication circuit 307 to these remote devices when in the enhanced security mode of operation.

In one or more embodiments, this captured information can first be stored internally within the electronic device 114 in a region 323 of memory 306 that can only be erased by the operating system. Where this occurs, even if there is a "factory reset" of the electronic device 114, this data will be protected.

In still another embodiment, the one or more processors 305 can periodically wake to perform the environmental monitoring with the operational user interface devices when in the enhanced security mode of operation. This works to conserve battery capacity. When operational, the one or more processors 305 can gather information, attempt to send identify the authorized user, deliver data representations of the one or more environmental inputs received to a remote electronic device, and so forth.

In this mode, the one or more processors 305 can detect whether an unauthorized user has somehow taken control of the electronic device 114 outside of the perimeter boundary of a geofence established by the geofence manager 308. This mode of operation advantageously allows the one or more processors 305 to determine if an unauthorized user has taken control of the electronic device 114, moved it outside the geofence, and optionally, to notify the authorized user and/or have the authorized user communicate with the electronic device 114 via the cloud.

Figure 5:
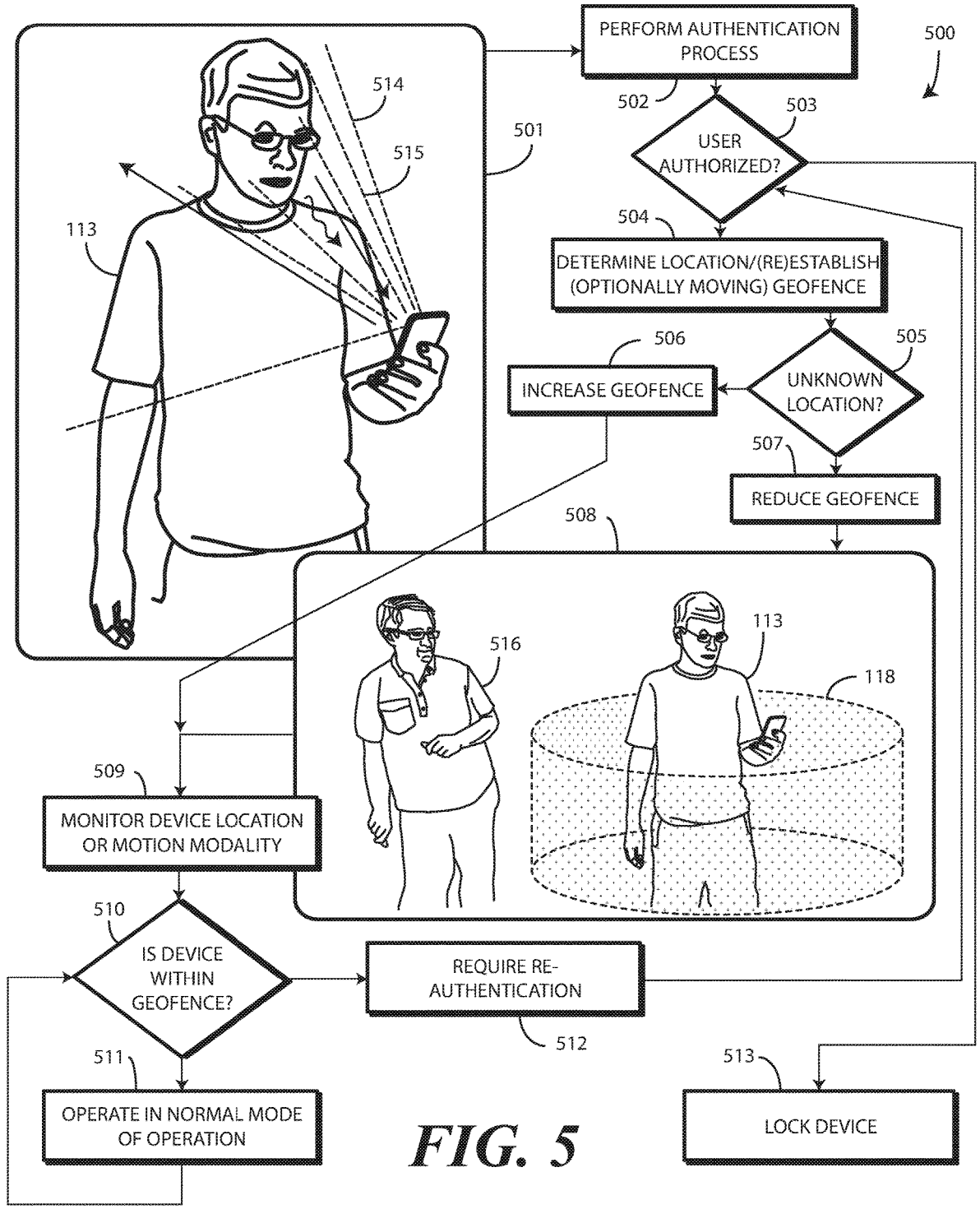
FIG. 5 illustrates still another explanatory method in accordance with one or more embodiments of the disclosure.

Turning now to FIG. 5, illustrated therein is another explanatory method 500 in accordance with one or more embodiments of the disclosure. In contrast to the method (100) of FIG. 1 above, where the geofence manager (308) of the electronic device 114 established a geofence 118 in response to the cessation of physical contact between the authorized user 113 and the electronic device 114, in the embodiment of FIG. 5 the geofence manager (308) of the electronic device 114 establishes the geofence 118 in response to authenticating the authorized user 113.

At step 501, the electronic device 114 attempts to authenticate a user as an authorized user 113 of the electronic device 114 in accordance with one or more embodiments of the disclosure. As described above, authentication can occur in a variety of ways. These ways can include by delivery of a fingerprint image to a fingerprint sensor, by entry of a PIN code, by voice recognition, by iris scan, or by other techniques. In this illustrative embodiment, the authorized user 113 is delivering a facial recognition input to an authentication system (314) to authenticate his or her self as an authorized user 113 of the electronic device 14. The facial recognition input can comprise two-dimensional imaging, depth scan imaging, thermal sensing, optionally one or more higher authentication factors, or combinations thereof.

In this illustrative embodiment, the authentication system (314) comprises an imager that captures at least one image 514 of an object situated within a predefined radius of the electronic device 114, which in this case is the authorized user 113. In one embodiment, the imager captures a single image 514 of the object. In another embodiment, the imager captures a plurality of images of the object. In one or more embodiments, the one or more images are each a two-dimensional image. For example, in one embodiment the image 514 is a two-dimensional RGB image. In another embodiment, the image 514 is a two-dimensional infrared image. Other types of two-dimensional images will be obvious to those of ordinary skill in the art having the benefit of this disclosure.

In one or more embodiments, the image 514 can be compared to one or more predefined reference images stored in memory (306) of the electronic device 114 at step 502. By making such a comparison, one or more processors disposed within the electronic device 114 can confirm whether the shape, skin tone, eye color, hair color, hair length, and other features identifiable in a two-dimensional image are that of the authorized user 113 identified by the one or more predefined reference images.

In one or more embodiments, authentication system (314) can further include a depth scanner (316). In one or more embodiments the depth scanner (316) captures at least one depth scan 515 of the object when situated within the predefined radius of the electronic device 114. In one embodiment, the depth imager captures a single depth scan 515 of the object. In another embodiment, the depth imager captures a plurality of depth scans of the object.

In one or more embodiments, the image 514 and the depth scan 515 are used in combination for authentication purposes. This results in the number of authorized user identification factors required for the authentication process of step 502 being two. In one or more embodiments one or more processors compare the image 514 with the one or more predefined reference images at step 502. The one or more processors then compare the depth scan 515 with the one or more predefined facial maps at step 502. Authentication, determined by decision 503, will fail in one or more embodiments unless the image 514 sufficiently corresponds to at least one of the one or more predefined images and the depth scan 515 sufficiently corresponds to at least one of the one or more predefined facial maps.

In one or more embodiments, authentication is successful, as determined by decision 503, where each of the following is true: the at least one image 514 sufficiently corresponds to at least one of the one or more predefined images and the at least one depth scan 515 sufficiently corresponds to at least one of the one or more predefined facial maps. Where both are true, decision 503 determines that the person of step 501 is authenticated 108 as the authorized user 113.

In one or more embodiments, when the authentication fails, as determined by decision 503, the one or more processors (305) of the electronic device can lock or limit full access the electronic device 114 to preclude access to it or the information stored therein at step 513. For example, if the at least one image 514 fails to sufficiently correspond to at least one of the one or more predefined images the one or more processors can lock the electronic device 114 at step 513 to preclude access to it or reduce access or the information stored therein. Similarly, if the at least one depth scan 515 fails to correspond to at least one of the one or more predefined facial maps, the one or more processors can lock the electronic device 114 at step 513 to preclude access to it or the information stored therein. When the electronic device 114 is locked, the one or more processors may then require additional authorized user identification factors beyond the image 514 or the depth scan 515 to authenticate a person as being authorized to use the electronic device 114 at the next authentication cycle.

At step 504, a location detector (339) of the electronic device 114 determines a location of the electronic device 114. In one or more embodiments, this determination of the location by the location detector (339) occurs when the authentication of the authorized user 113 occurs. Thus, the location identified by the location detector (339) is the location of authentication in such an embodiment. In one or more embodiments, step 504 also comprises a geofence manager (308) of the electronic device 114 establishing a geofence 118 about the location in response to authentication of the authorized user 113.

Decision 505 determines whether the location detected at step 504 matches one or more predefined criteria. For example, in one embodiment decision 505 determines whether the location detected at step 504 is a known area, such as the office of the authorized user 113, the home of the authorized user 113, or other known location. Where it is, the method 500 moves to step 506 where one or more processors (305) of the electronic device 114 expand the default-predefined radius of the geofence 118.

By contrast, where decision 505 determines that the location detected at step 504 is an unknown area, unrecognized location, unfamiliar area, newly visited area, or that some other odd context is occurring, in one or more embodiments the method 500 moves to step 507 where the one or more processors (305) of the electronic device 114 reduce the default radius of the geofence 118. Illustrating by example, as shown at step 508, the authorized user 113 is standing near a person 516 that the authentication system (314) of the electronic device 114 cannot identify. The person 516 may ne nefarious. Accordingly, in one or more embodiments the one or more processors (305) of the electronic device 114, at decision 505, determine that the location matches a predefined criterion of being an odd context. The one or more processors (305) of the electronic device 114 then, at step 507, reduce the default radius of the geofence 118 as shown at step 508.

As before, in the method 500 of FIG. 5, the one or more processors (305) of the electronic device 114 operate the electronic device 114 in a first mode of operation while the electronic device 114 remains within the geofence 118, but operation the electronic device 114 in a different mode of operation when the electronic device 114 moves outside the geofence 118. In the illustrative embodiment of FIG. 5, the one or more processors (305) of the electronic device 114 operate the electronic device 114 in a normal mode of operation while all three of the following occur: the electronic device 114 remains within the geofence 118; the electronic device 114 remains in an unlocked mode of operation; and the electronic device 114 remains in physical contact with the authorized user 113, as shown in step 508. Whether these three conditions are true is determined at decision 510, with the one or more processors (305) of the electronic device 114 operating the electronic device 114 in the normal mode of operation at step 511.

However, the one or more processors (305) of the electronic device 114 require reauthentication of the authorized user 113 at step 512 when any one of the following occur: the electronic device 114 exits the geofence 118; the electronic device 114 enters a locked mode of operation, or there is a cessation of the physical contact between the authorized user 113 and the electronic device 114. Whether any one of these conditions occurs is determined at decision 510. Upon failing to authenticate the authorized user 113 at step 512, in one or more embodiments step 512 further comprises causing, by the one or more processors (305) of the electronic device 114, the electronic device 114 to enter an enhanced security mode of operation.

In one or more embodiments, optional step 509 comprises detecting, with one or more motion detectors (912) of the electronic device 114, motion of the electronic device 114 while the electronic device 114 is within the geofence 118 and is operating in the normal mode of operation. In one or more embodiments, step 511 can then cause the geofence 118 to move in accordance with the detected motion of the electronic device 114.

Figure 11:
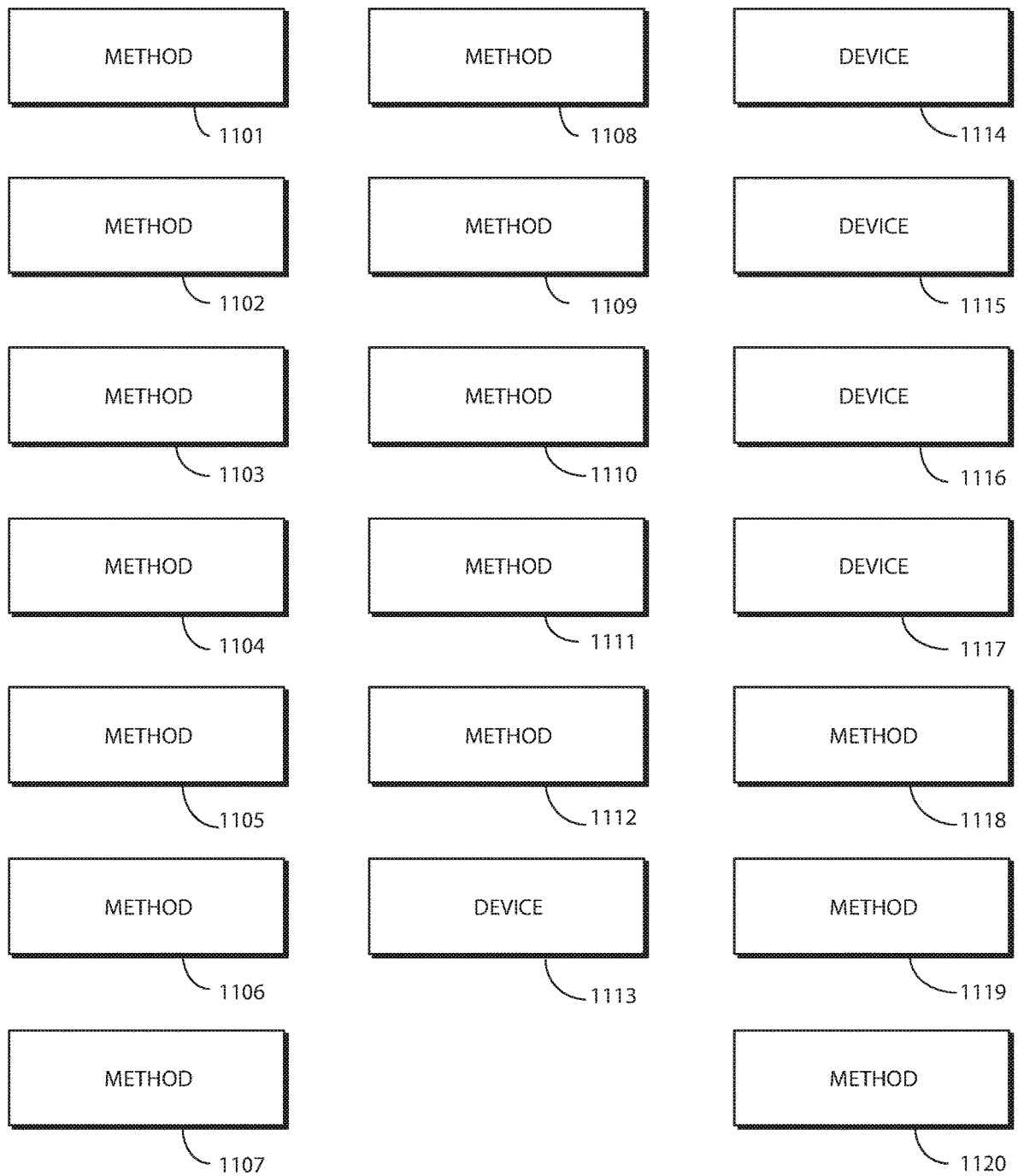
FIG. 11 illustrates various embodiments of the disclosure.

Turning now to FIG. 11, illustrated therein are various embodiments of the disclosure. At 1101, a method in an electronic device comprises detecting, with one or more sensors, a cessation of physical contact between an authorized user of the electronic device and the electronic device. At 1101, the method comprises determining, with a location detector, a location of the electronic device when the cessation of physical contact occurs.

At 1101, the method comprises establishing, with a geofence manager, a geofence about the location in response to the cessation of physical contact between the authorized user of the electronic device and the electronic device. At 1101, the method comprises operating, by one or more processors operable with the geofence manager, the electronic device in a normal mode of operation while the electronic device remains within the geofence. At 1101, the method comprises operating, by one or more processors operable with the geofence manager, the electronic device in an enhanced security mode of operation when the electronic device exits the geofence.

At 1102, the method of 1101 further comprises detecting, with one or more motion sensors, a stationary state of the electronic device. At 1102, the establishing the geofence about the location occurs only when the one or more motion sensor detect the stationary state.

At 1103, the enhanced security mode of operation of 1102 requires reauthorization of the authorized user of the electronic device. At 1104, the enhanced security mode of operation of 1102 disables one or more features of the electronic device.

At 1105, the enhanced security mode of operation of 1102 increases a number of authorized user identification factors required to return to the normal mode of operation. At 1106, the enhanced security mode of operation of 1102 disables user interface output devices of the electronic device while maintaining operation of one or more input devices of the electronic device.

At 1107, the method of 1106 further comprises emulating, with the user interface output devices of the electronic device, a powered OFF state of the electronic device. At 1108, the method of 1106 further comprises monitoring, with the one or more input devices, one or more inputs from an environment of the electronic device. At 1109, the method of 1108 further comprises transmitting, across a network with a wireless communication circuit, data representations of the one or more inputs to a remote electronic device. At 1110, the method of 1106 further comprises transmitting, across a network with a wireless communication circuit, a notification that the electronic device has exited the geofence.

At 1111, the method of 1101 further comprises detecting, with the one or more sensors while the electronic device remains within the geofence, a recurrence of the physical contact between the authorized user of the electronic device and the electronic device. At 1111, the method of 1101 further comprises terminating, with the geofence manager, the geofence about the location in response to the recurrence of the physical contact between the authorized user of the electronic device and the electronic device.

At 1112, the method of 1111 further comprises detecting, with the one or more processors and the one or more sensors, the location being an unrecognized location. At 1112, the method of 1111 further comprises reducing, with the geofence manager, a radius of the geofence in response to identifying the location as the unrecognized location.

At 1113, an electronic device comprises one or more sensors. At 1113, the electronic device comprises a location detector. At 1113, the electronic device comprises a geofence manager. At 1113, the electronic device comprises one or more processors operable with the one or more sensors, the location detector, and the geofence manager.

At 1113, the one or more processors cause the geofence manager to establish a geofence about a location detected by the location detector when one of the following occurs: the one or more sensors detect a cessation of physical contact between an authorized user of the electronic device and the electronic device; or the one or more sensors authenticate the authorized user of the electronic device.

At 1113, the one or more processors cause the electronic device to transition from a normal mode of operation to an enhanced security mode of operation when one of the following occurs: the one or more sensors detect electronic device exiting the geofence; or the electronic device enters a locked mode of operation; or the one or more sensors detect the cessation of the physical contact between the authorized user of the electronic device and the electronic device.

At 1114, the electronic device of 1113 further comprises one or more motion detectors. At 1113, the one or more processors cause the geofence manager to move the geofence with the electronic device from the location when the one or more motion detectors detect motion of the electronic device from the location while in the normal mode of operation.

At 1115, the electronic device of 1113 further comprises a user interface receiving user input defining a default radius of the geofence. At 1116, the one or more processors of 1113 cause the geofence manager to one of expand the default radius or reduce the default radius as a function of whether the location matches one or more predefined criteria.

At 1117, the electronic device of 1115 further comprises an audio output device. At 1117, the one or more processors cause the audio output device to emit an audible alarm when the electronic device is operating in the enhanced security mode of operation.

At 1118, a method in an electronic device comprises authenticating, with one or more sensors, an authorized user of the electronic device and the electronic device. At 1118, the method comprises determining, with a location detector, a location of the electronic device when authentication of the authorized user occurs.

At 1118, the method comprises establishing, with a geofence manager, a geofence about the location in response to the authentication of the authorized user. At 1118, the method comprises operating, by one or more processors operable with the geofence manager, the electronic device in a normal mode of operation while each of the following occurs: the electronic device remains within the geofence; and the electronic device remains in an unlocked mode of operation; and the electronic device remains in physical contact with the authorized user. At 1118, the method comprises requiring the reauthentication of the authorized user when any one or more of the following occur: the electronic device exits the geofence; or the electronic device enters a locked mode of operation; or the physical contact of the electronic device with the authorized user ceases.

At 1119, the method of 1118 further comprises detecting, with one or more motion sensors, motion of the electronic device while in the normal mode of operation. At 1119, the method comprises causing the geofence to move in accordance with the motion of the electronic device.

At 1120, the method of 1119 further comprises requiring the reauthentication of the authorized user upon the one or more motion sensors detecting a cessation of the motion of the electronic device. At 1120, the method comprises causing, by the one or more processors, the electronic device to enter an enhanced security mode of operation upon failing to reauthenticate the authorize user after requiring the reauthentication of the authorized user.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. A method in an electronic device, the method comprising:
   detecting, with one or more sensors, a cessation of physical contact between an authorized user of the electronic device and the electronic device;
   determining, with a location detector, a location of the electronic device when the cessation of physical contact occurs;
   establishing, with a geofence manager, a geofence about the location in response to the cessation of physical contact between the authorized user of the electronic device and the electronic device;
   operating, by one or more processors operable with the geofence manager, the electronic device:
      in a normal mode of operation while each of the following occurs: the electronic device remains within the geofence; and the electronic device remains in an unlocked mode of operation; and the electronic device remains in physical contact with the authorized user; and
      in an enhanced security mode of operation when the electronic device exits the geofence.

2. The method of claim 1, further comprising detecting, with one or more motion sensors, a stationary state of the electronic device, wherein the establishing the geofence about the location occurs only when the one or more motion sensor detect the stationary state.

3. The method of claim 2, the enhanced security mode of operation precluding both a factory reset of the electronic device and an erasure of data from the electronic device.

4. The method of claim 2, the enhanced security mode of operation disabling all visual output devices, all audio output devices, and all haptic devices of the electronic device.

5. The method of claim 2, the enhanced security mode of operation increasing a number of authorized user identification factors required to return to the normal mode of operation by requiring an imager of the electronic device to capture one or more images and also requiring entry of a predefined code to return to the normal mode of operation when the one or more images depict more than one person.

6. The method of claim 2, the enhanced security mode of operation disabling user interface output devices of the electronic device while maintaining operation of one or more input devices of the electronic device, the user interface output devices comprising all visual output devices, audio output devices, and haptic output devices, the one or more input devices comprising one or more of an imager, a microphone, a geo-locator, a wireless communication circuit, and a motion detector, further comprising monitoring an environment of the electronic device using the one or more input devices.

7. The method of claim 6, further comprising emulating, with the user interface output devices of the electronic device, a powered OFF state of the electronic device while monitoring an environment of the electronic device using the one or more input devices.

8. The method of claim 2, further comprising delivering, while in the enhanced security mode of operation, an output drawing attention to a biometric input, wherein the output comprises an animation on a display.

9. The method of claim 8, further comprising emitting a loud screaming sound when the electronic device exits the geofence.

10. The method of claim 2, further comprising making a gallery application, a phone application, an email application, and a device usage history application invisible when the electronic device has exited the geofence.

11. The method of claim 1, further comprising:
   detecting, with the one or more sensors while the electronic device remains within the geofence, a recurrence of the physical contact between the authorized user of the electronic device and the electronic device; and
   terminating, with the geofence manager, the geofence about the location in response to the recurrence of the physical contact between the authorized user of the electronic device and the electronic device.

12. The method of claim 11, further comprising detecting, with the one or more processors and the one or more sensors, the authorized user standing near an unidentifiable person, further comprising reducing, with the geofence manager, a radius of the geofence in response to detecting the authorized user standing near the unidentifiable person.

13. An electronic device, comprising:
   one or more sensors;
   a location detector;
   a geofence manager;
   an audio output device; and
   one or more processors operable with the one or more sensors, the location detector, and the geofence manager;
   the one or more processors causing the geofence manager to establish a geofence about a location of the electronic device detected by the location detector when the one or more sensors detect a cessation of physical contact between an authorized user of the electronic device and the electronic device; and
   the one or more processors causing the electronic device to transition from a normal mode of operation to an enhanced security mode of operation when one of the following occurs:
      the one or more sensors detect the electronic device exiting the geofence; or
      the electronic device enters a locked mode of operation; or
      the one or more sensors detect the cessation of the physical contact between the authorized user of the electronic device and the electronic device;
   wherein the one or more processors cause the audio output device to emit an audible alarm when the electronic device is operating in the enhanced security mode of operation; and wherein the electronic device operates in the normal mode of operation while each of the following occurs: the electronic device remains within the geofence; and the electronic device remains in an unlocked mode of operation; and the electronic device remains in physical contact with the authorized user.

14. The electronic device of claim 13, further comprising one or more motion detectors, the one or more processors causing the geofence manager to move the geofence with the electronic device from the location when the one or more motion detectors detect motion of the electronic device from the location while in the normal mode of operation.

15. The electronic device of claim 13, wherein a default radius of the geofence is thirty feet.

16. The electronic device of claim 13 the one or more processors causing the geofence manager to expand a default radius of the geofence when the location detected by the location detector when the one or more sensors detect the cessation of physical contact between the authorized user of the electronic device and the electronic device is a known location.

17. The electronic device of claim 16, the one or more processors causing the geofence manager to reduce the default radius when the location detected by the location detector when the one or more sensors detect the cessation of physical contact between the authorized user of the electronic device and the electronic device is an unknown location.

18. A method in an electronic device, the method comprising:
authenticating, with one or more sensors, an authorized user of the electronic device and the electronic device;
determining, with a location detector, a location of the electronic device when authentication of the authorized user occurs;
establishing, with a geofence manager, a geofence about the location in response to authentication of the authorized user in response to the authenticating, with the one or more sensors, the authorized user of the electronic device;
operating, by one or more processors operable with the geofence manager, the electronic device in a normal mode of operation while each of the following occurs:
the electronic device remains within the geofence; and
the electronic device remains in an unlocked mode of operation; and
the electronic device remains in physical contact with the authorized user; and
requiring reauthentication of the authorized user when any one or more of the following occur:
the electronic device exits the geofence; or
the electronic device enters a locked mode of operation; or
the physical contact of the electronic device with the authorized user ceases.

19. The method of claim 18, further comprising:
operating the electronic device in an enhanced security mode of operation when the electronic device exits the geofence;
receiving incorrect user credentials while operating in the enhanced security mode of operation; and
entering a hard lockdown mode of operation in response to receiving the incorrect user credentials.

20. The method of claim 18, further comprising requiring the reauthentication of the authorized user upon one or more motion sensors detecting a cessation of motion of the electronic device, and causing, by the one or more processors, the electronic device to enter an enhanced security mode of operation upon failing to reauthenticate the authorize user after reauthentication of the authorized user is required when the any one or more of the following occur:
the electronic device exits the geofence; or
the electronic device enters the locked mode of operation; or
the physical contact of the electronic device with the authorized user ceases;
wherein an enhanced security mode of operation disables financial applications, health applications, fitness applications, email applications, social media applications, and text applications.

* * * * *